US007152209B2

(12) United States Patent
Jojic et al.

(10) Patent No.: US 7,152,209 B2
(45) Date of Patent: Dec. 19, 2006

(54) USER INTERFACE FOR ADAPTIVE VIDEO FAST FORWARD

(75) Inventors: Nebojsa Jojic, Redmond, WA (US); Nemanja Petrovic, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 867 days.

(21) Appl. No.: 10/401,371

(22) Filed: Mar. 28, 2003

(65) Prior Publication Data

US 2004/0189691 A1    Sep. 30, 2004

(51) Int. Cl.
*G11B 27/00*    (2006.01)

(52) U.S. Cl. ............... 715/720; 715/719; 715/723; 715/838; 725/37; 707/3; 382/305

(58) Field of Classification Search ........ 715/719–723, 715/764, 781, 786, 835, 838, 968, 973; 725/37; 707/3, 6; 382/181, 305
See application file for complete search history.

(56) References Cited

U.S. PATENT DOCUMENTS

| | | | | |
|---|---|---|---|---|
| 5,537,528 | A | * | 7/1996 | Takahashi et al. .......... 715/512 |
| 5,802,361 | A | * | 9/1998 | Wang et al. ................. 382/217 |
| 6,282,549 | B1 | * | 8/2001 | Hoffert et al. ........... 707/104.1 |
| 6,636,220 | B1 | * | 10/2003 | Szeliski et al. ............. 345/475 |
| 2002/0002550 | A1 | * | 1/2002 | Berman .......................... 707/3 |
| 2003/0093790 | A1 | * | 5/2003 | Logan et al. ................. 725/38 |

OTHER PUBLICATIONS

Burl, M. C., M. Weber, P. Perona, A probabilistic approach to object recognition using local photometry and global geometry, *Proc. 6th Europe Conf. Comp. Vision, ECCV*, 1998, pp. 628-641.

Chang, S.-F., W. Chen, H. J. Meng, H. Sundaram, and D. Zhong, A fully automated content-based video search engine supporting spatiotemporal queries, *IEEE Trans. on Circuits and Systems for Video Tech.*, Sep. 1998, vol. 8, No. 4, pp. 602-615.

De Bonet, J., and P. Viola, Structure driven image database retrieval, *Proc. of the 1997 Conf. on Advances in Neural Information Processing Systems 10*, Jul. 1998, Denver, Colorado, pp. 866-872.

Hadjidemetriou, E., M. D. Grossberg and S. K. Nayar, Spatial information in multiresolution histograms, *IEEE Comp. Society Conf. on Comp. Vision and Pattern Recognition*, CVPR'01, 2001, vol. 1, pp. 702-709.

(Continued)

*Primary Examiner*—Lucila X. Bautista
(74) *Attorney, Agent, or Firm*—Lyon & Harr, LLP; Mark A. Watson

(57) ABSTRACT

A user interface (UI) for adaptive video fast forward provides a novel fully adaptive content-based UI for allowing user interaction with an image sequence or video relative to a user identified query sample. This query sample is drawn either from an image sequence being searched or from another image sequence entirely. The user interaction offered by the UI includes providing a user with computationally efficient searching, browsing and retrieval of one or more objects, frames or sequences of interest in video or image sequences, as well as automatic content-based variable-speed playback based on a computed similarity to the query sample. In addition, the UI also provides the capability to search for image frames or sequences that are dissimilar to the query sample, thereby allowing the user to quickly locate unusual or different activity within an image sequence.

47 Claims, 11 Drawing Sheets

OTHER PUBLICATIONS

Irani, M., P. Anandan, Video indexing based on mosaic representations, *IEEE Transactions on Pattern Analysis and Mach. Inteligence*, vol. 86, No. 5, 1998, pp. 905-921.

Jojic, N., B. Frey, Learning flexible sprites in video layers, *Proc. of IEEE Conf. on Comp. Vison and Pattern Recognition*, (*CVPR 01*), 2001, pp. 199-206.

Jojic, N., N. Petrovic, B. Frey, and T. Huang, Transformed hidden Markov models: Estimating mixture models of images and inferring spatial transformations in video sequences, *IEEE Conf. on Comp. Vision and Pattern Recognition*, 2000, vol. 2, pp. 26-33.

Maron, O., A. L. Ratan, Multiple-instance learning for natural scene classification, *Proc. 15th Int'l Conf. on Machine Learning*, 1998, pp. 341-349.

Ngo, C.-W., T.-C. Pong, H.-J. Zhang, On clustering and retrieval of video shots, *Proc. of 9th ACM Multimedia Conf.*, 2001, pp. 51-60.

Pingali, G. S., A. Opalach, I. Carlbom, Multimedia retrieval through spatio-temporal activity maps, *ACM Multimedia*, 2001, pp. 129-136.

Rui, Y., A. Gupta, A. Acero, Automatically extracting highlights for TV baseball programs, *Proc. of 8th ACM Int'l Conf. on Multimedia*, Los Angeles, CA, 2000, pp. 105-115.

Schmid, C., Constructing models for content-based image retrieval, *Proc. IEEE Comp. Soc'y Conf. Comp. Vision and Pattern Recognition*, 2001, Hawaii, vol. 2, pp. 39-45.

Stauffer, C., E. G. Miller, and K. Tieu, Transform-invariant image decomposition with similarity templates, *Advances in Neural Information Processing Systems 14*, MIT Press, Cambridge, MA, 2002, pp. 1295-1302.

Swain, M. J., and D. H. Ballard, Color indexing, *Int'l J. of Comp. Vision*, 1991, vol. 7, No. 1, pp. 11-32.

Tieu, K., and P. Viola, Boosting image retrieval, *Proc. of the IEEE Conf. on Comp. Vision and Patterns Recognition*, 2000, pp. 228-235.

Weber, M., M. Welling, and P. Perona, Unsupervised learning of models for recognition, *Proc. European Conf. of Comp. Vision*, 2000, pp. 18-32.

Wren, C., A. Azarbayejani, T. Darrell and A. Pentland. Pfinder: Real-time tracking of the human body, *IEEE Transactions on Pattern Analysis and Mach. Intelligence*, Jul. 1997, vol. 19, No. 7, pp. 780-785.

Zelnik-Manor, L., and M. Irani, Event-based analysis of video, *Proc. of the 2001 IEEE Comp. Soc'y Conf. on Comp. Vision and Pattern Recognition*, 2001, vol. 2, pp. 123-130.

\* cited by examiner

Frame f   p(s=0|f)   p(s=1|f)   p(s=2|f)   p(s=3|f)

Frame f   p(s=0|f)   p(s=1|f)   p(s=2|f)   p(s=3|f)

USER INTERFACE FOR ADAPTIVE VIDEO FAST FORWARD

BACKGROUND

1. Technical Field

The invention is related to a user interface for searching, browsing, retrieval and playback of images or image sequences from a video clip or other image sequence, and in particular, to a user interface for providing automatic fully adaptive content-based interaction and variable-speed playback of image sequences corresponding to a user identified query sample.

2. Related Art

Conventional schemes for searching through image sequences include content-based search engines that use various types of aggregate statistics over visual features, such as color or texture elements of frames in the image sequence. However, these schemes tend to be sensitive to the quality of the data. While professionally captured or rendered image sequences tend to be of high quality, often, a home video or the like is of relatively poor quality unsuited for use with such conventional schemes. For example, a typical home video or image sequence having bad or degraded color characteristics, or blurry or out of focus portions of scenes within the image sequence makes it difficult to recognize textures within that image sequence. As a result, these conventional statistics-based search engines perform poorly in such an environment.

However, a more serious limitation of existing schemes is that the spatial configuration of any particular scene is typically not encoded in the scene description, thereby making analysis of the image sequence more difficult. In order to address this concern, one conventional scheme attempts to preserve some of the spatial information using multiresolution color histograms. Other approaches attempt to circumvent the lack of global spatial information in representations based on local features by working with a large number of features and automatically selecting the most discriminative ones.

In either case, the conventional approaches that attempt to model the spatial layout of particular regions within an image sequence are subject to several limitations. In particular, the limitations of conventional spatial-layout based schemes include the amount of user interaction required for specifying positive and negative examples, the small size of foreground objects that can be modeled, thereby limiting the application domain, and the necessity of handcrafting cost functions that need to be manually weighted.

Another conventional scheme has attempted to jointly model motion and appearance by using derivatives in the space-time volume for searching through image sequences. However, this scheme is both complicated and computationally inefficient.

Yet another conventional scheme provides a comprehensive search engine that allows for a motion-based search based on a query consisting of region appearances and sketched motion patterns. This search engine is typically used by professional users searching for particular actions or activities in professional sporting events such as soccer. However, this scheme requires a significant amount of user input in order to identify scenes or image sequences of interest, and is not ideally suited for home use.

Therefore, what is needed is a computationally efficient system and method for automatically searching or browsing through videos or other image sequences to identify scenes or image sequences of interest. Further, such a system and method should be adapted to work well with either high quality image data, such as a typical television type broadcast, or with relatively poor quality image data, such as, for example, a typical home video or image sequence. Finally, such a system and method should require minimal user input to rapidly and automatically identify image scenes or sequences of interest to the user.

SUMMARY

A user interface (UI) for adaptive video fast forward, as described herein, provides a novel fully adaptive content-based UI for allowing user interaction with an "image sequence analyzer" for analyzing image sequences relative to a user identified query sample. This query sample is drawn either from an image sequence being searched or from another image sequence entirely. The interaction provided by the image sequence analyzer UI provides a user with computationally efficient searching, browsing and retrieval of one or more objects, frames or sequences of interest in video or image sequences, as well as automatic content-based variable-speed playback based on a computed similarity to the query sample.

In general, the ability to search, browse, or retrieve such information in a computationally efficient manner is accomplished by first providing or identifying the aforementioned query sample. This query sample consists of a sequence of one or more image frames representing a scene or sequence of interest. In one embodiment, the UI provides the capability to select a sequence of one or more frames directly from an image sequence or video as it is displayed on a computer display device. In one embodiment, once selected, the query sample is either automatically or manually saved to a computer storage medium for later use in searching either the same or different image sequences. In still another embodiment, a representative frame from the query sample is provided within the UI in a "query sample window." Alternately, a looped playback of the entire query sample is provided in the query sample window.

Given the query sample, the image sequence is searched to identify those image frames or frame sequences which are similar to the query sample, within a user adjustable similarity threshold. As the image sequence is automatically searched, static thumbnails representing matches to the query sample are presented via the UI in a "query match window." Each of these thumbnails is active in the sense that the user may select any or all of the thumbnails for immediate playback, printing, saving, etc., as desired. Note that in a related alternate embodiment, the results of the search are inverted such that the search returns those image frames or frame sequences which are dissimilar to the query sample, again within a user adjustable similarity threshold.

In addition, the user is provided with several features and options with respect to video playback in alternate embodiments of the UI described herein. For example, in one embodiment, as the aforementioned query-based similarity search is proceeding, a "playback window" will automatically play the video being searched, so that the user can view the video sequence. However, the playback speed of that video is dynamic with respect to the similarity of the current frame to the query sample. In particular, as the similarity of the current frame or frame sequence to the query sample increases, the current playback speed of the video sequence will automatically slow towards normal playback speed. Conversely, as the similarity of the current frame or frame sequence to the query sample decreases, the current playback speed of the video sequence will automatically increase speed in inverse proportion to the computed similarity. In this manner, the user is provided with the capability to quickly view an entire video sequence, with only those portions of interest to the user being played in a normal or near normal speed.

In a related embodiment, a playback speed slider bar is provided via the UI to allow for real-time user adjustment of the playback speed. Note that as the playback speed automatically increases and decreases in response to the computed similarity of the current image frames, the playback speed slider bar moves to indicate the current playback speed. However, at any time, the user is permitted to override this automatic speed determination by simply selecting the slider bar and either decreasing or increasing the playback speed, from dead stop to fast forward, as desired.

Finally, in still another embodiment, a "video index window" is provided via the UI. The contents of the video index window are automatically generated by simply extracting thumbnail images of representative image frames at regular intervals throughout the entire video or image sequence. Further, in one embodiment, similar to the thumbnails in the query match window, the thumbnails in the video index window are active. In particular, user selection of any particular thumbnail within the video index window will automatically cause the playback window to begin playing the video from the point in the video where that particular thumbnail was extracted. In related embodiment, a video position slider bar is provided for indicating the current playback position of the video, relative to the entire video. Note that while this slider bar moves in real-time as the video is played, it is also user adjustable; thereby allowing the user to scroll through the video to any desired position. Further, in yet another embodiment, the thumbnail in the video index window representing the particular portion of the video which is being played is automatically highlighted as the corresponding portion of the video is played.

As will be appreciated by those skilled in the art, the UI described above can make use of any of a number of query-based image sequence search techniques, so long as the search technique used is capable of determining a similarity between a query sample and a target image sequence. However, for purposes of explanation, one particular search technique is described. Specifically, this search technique involves the use of a probabilistic generative model, which models multiple, possibly occluding objects in the query sample. This probabilistic model is automatically trained on the query sample.

Once the model has been trained, one or more image frames from the target image sequence are then compared to the generative model. A likelihood, or similarity, under the generative model is then used to identify image frames or sequences which are similar to the original query sample. Conversely, in an alternate embodiment, the learned generative model is used in analyzing one or more videos or image sequences to identify those frames or sequences of the overall image sequence that are dissimilar to the image sequence used to learn the generative model. This embodiment is particularly useful for identifying atypical or unusual portions of a relatively unchanging or constant image sequence or video, such as, for example, movement in a fixed surveillance video, or a long video of a relatively unchanging ocean surface that is only occasionally interrupted by a breaching whale.

In general, the aforementioned scene generative model, which is trained on the query sample, describes a spatial layout of multiple, possibly occluding objects, in a scene.

This generative model represents a probabilistic description of the spatial layout of multiple, possibly occluding objects in a scene. In modeling this spatial layout, any of a number of features may be used, such as, for example, object appearance, texture, edge strengths, orientations, color, etc. However, for purposes of explanation, the following discussion will focus on, the use of R, G, and B (red, green and blue) color channels in the frames of an image sequence for use in learning scene generative models for modeling the spatial layout of objects in the frames of the image sequence. In particular, objects in the query sample are modeled using a number of probabilistic color "blobs."

In one embodiment, the number of color blobs used in learning the scene generative model is fixed. In another embodiment, the number of color blobs to be used is provided as an adjustable user input. Further, in yet another embodiment, the number of color blobs is automatically estimated from the data using conventional probabilistic techniques such as, for example, evidence-based Bayesian model selection and minimum description length (MDL) criterion for estimating a number of blobs from the data.

In general, given the number of color blobs to be used, along with a query sample drawn from an image sequence, the, generative model is learned through an iterative process which cycles through the frames of the query sample until model convergence is achieved. The generative model models an image background using zero color blobs for modeling the image sequence representing the query sample, along with a number of color blobs for modeling one or more objects in query sample. The generative model is learned using a variational expectation maximization (EM) algorithm which continues until convergence is achieved, or alternately, until a maximum number of iterations has been reached. As is well known to those skilled in the art, a variational EM algorithm is a probabilistic method which can be used for estimating the parameters of a generative model.

Once the scene generative model is computed, it is then used to compute the likelihood of each frame of an image sequence as the cost on which video browsing, search and retrieval is based. Further, in one embodiment, once learned, one or more generative models are stored to a file or database of generative models for later use in analyzing either the image or video sequence from which the query sample was selected, or one or more separate image sequences unrelated to the sequence from which the query sample was selected.

In addition to the just described benefits, other advantages of the image sequence analyzer will become apparent from the detailed description which follows hereinafter when taken in conjunction with the accompanying drawing figures.

DESCRIPTION OF THE DRAWINGS

The specific features, aspects, and advantages of the image sequence analyzer will become better understood with regard to the following description, appended claims, and accompanying drawings where:

DETAILED DESCRIPTION OF THE PREFERRED EMBODIMENTS

In the following description of the preferred embodiments of the user interface (UI) for interacting with an image sequence analyzer, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
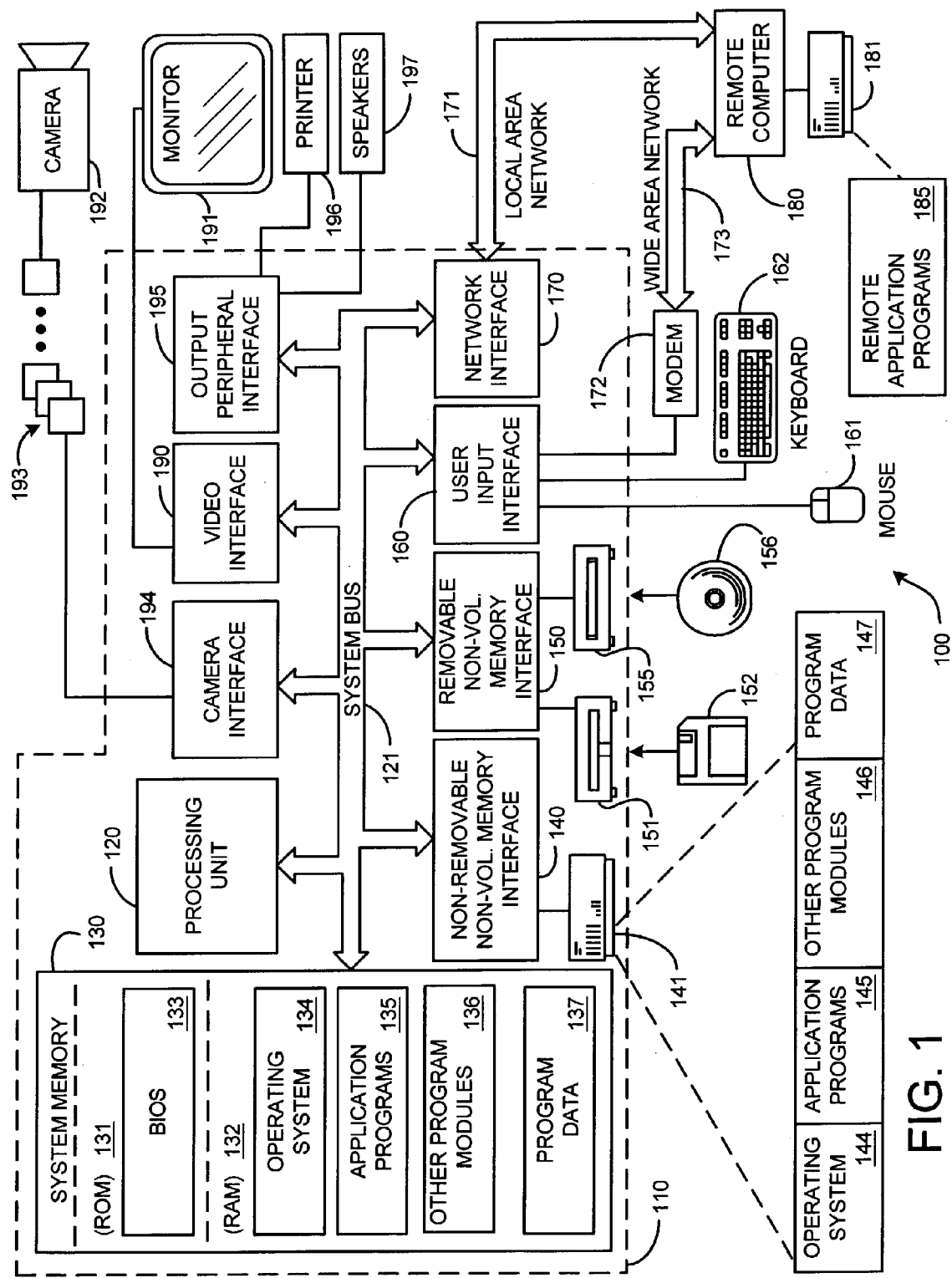
FIG. 1 is a general system diagram depicting a general-purpose computing device constituting an exemplary system for using generative models in an automatic fully adaptive content-based analysis of image sequences.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a user interface for use in an automatic fully adaptive content-based analysis of one or more image sequences.

2.0 Introduction:

A user interface (UI) for adaptive video fast forward, as described herein, provides a novel fully adaptive content-based UI for allowing user interaction with an "image sequence analyzer" for analyzing image sequences relative to a user identified query sample. This query sample is drawn either from an image sequence being searched or from another image sequence entirely. The interaction provided by the image sequence analyzer UI provides a user with computationally efficient searching, browsing and retrieval of one or more objects, frames or sequences of interest in video or image sequences, as well as automatic content-based variable-speed playback based on a computed similarity to the query sample.

Further, in one embodiment, the aforementioned "image sequence analyzer," as described herein, provides the noted functionality for the UI by using computationally efficient scene generative models in an automatic fully adaptive content-based analysis. This content based analysis provides an analysis of one or more image sequences for classifying those image sequences, or otherwise identifying content of interest in the image sequences. In general, the "image sequence analyzer," as described herein, provides for computationally efficient searching, browsing and retrieval of one or more objects, frames or sequences of interest in video or image sequences.

The ability to search, browse, or retrieve such information in a computationally efficient manner is accomplished by first providing or identifying a query sample, consisting of a sequence of image frames representing a scene or sequence of interest. A probabilistic scene generative model, which models multiple, possibly occluding objects in the query sample, is then automatically trained on the query sample. Next one or more image frames are then compared to the generative model, with a likelihood under the generative model being used to identify image frames or sequences which are either similar or dissimilar to the original query sample.

2.1 System Overview:

For purposes of explanation, the following discussion first describes a probabilistic framework for implementing the aforementioned image sequence analyzer. After describing this probabilistic framework, the user interface is described with reference to the operation of the image sequence analyzer. However, as will be appreciated by those skilled in the art, the UI described herein can make use of any of a number of query-based image sequence search techniques, so long as the search technique used is capable of determining a similarity between a query sample and a target image sequence.

Two extremes in the design of similarity measures for media search and retrieval are the use of very simple aggregate feature statistics and the use of complex, manually defined measures involving appearance, spatial layout and motion. Using a generative model that explains an image scene in terms of its components, including appearance and motion of various objects has the advantage that while it stays simple to use, it can still capture the various concurrent causes of variability in the sequence presented as a query. Both of these properties come from prescribing to a machine learning paradigm, in which the model adapts to the data, automatically balancing various causes of variability.

As described in detail below, in the process of integrating hidden variables in order to come up with a single likelihood number under a generative model, each image frame in an image sequence is automatically broken into components and the similarity to the model is computed according to learned amounts of variability in various parts of the generative model. However, the ultimate cost depends on how likely the learned generative model is to generate each observed frame. Consequently, any of the multiple possible ways to explain the training data is usually satisfactory, as long as the structure of the generative model and the number of parameters are limited to avoid overtraining. The generative model structure described below mimics the structure of the real world in terms of the existence of multiple objects possibly occluding each other and slightly changing shape, position and appearance.

The system and method described herein uses computationally efficient scene generative models in an automatic fully adaptive content-based analysis of image sequences provides many advantages. For example, it allows a user to quickly identify or catalog the contents of one or more videos or other image sequences, while requiring only minimal user input and interaction.

For example, in one embodiment, analysis of one or more image sequences is accomplished given a minimal user input, consisting simply of identifying a representative image sequence to be used for training the scene generative model, i.e., the aforementioned query sample. Given this input, the generative model is automatically learned, and then used in analyzing one or more videos or image sequences to identify those frames or sequences of the overall image sequence that are similar to the image sequence used to learn the generative model. Conversely, in an alternate embodiment, the learned generative model is used to identify those frames or sequences of the overall image sequence that are dissimilar to the query sample. This embodiment is particularly useful for identifying atypical or unusual portions of a relatively unchanging or constant image sequence or video, such as movement in a fixed surveillance video, or short segments of a long video of a relatively unchanging ocean surface that is only occasionally interrupted by a breaching whale.

As noted above, the generative model is trained on a query sample which represents a user selected sequence of images of interest that are drawn from an image sequence. In general, the aforementioned scene generative model represents a probabilistic description of the spatial layout of multiple, possibly occluding objects in a scene. In modeling this spatial layout, any of a number of features may be used, such as, for example, object appearance, texture, edge strengths, orientations, color, etc. However, for purposes of explanation, the following discussion will focus on the use of R, G, and B (red, green and blue) color channels in the frames of an image sequence for use in learning scene generative models for modeling the spatial layout of objects in the frames of the image sequence. Further, it should be appreciated by those skilled in the art that the image sequence analyzer described herein is capable of working equally well with any of a number of types of scene generative models for modeling the spatial layout of a sequence of images, and that the image sequence analyzer is not limited to use of the color blob-based scene generative models described below.

As noted above, objects in the query sample are modeled using a number of probabilistic color "blobs." In one embodiment, the number of color blobs used in learning the scene generative model is fixed, while in alternate embodiments, the number of color blobs to be used is provided either as an adjustable user input, or automatically estimated using conventional probabilistic techniques to analyze the selected image sequence to determine a number of discrete areas or blobs within the image sequence.

Given the number of color blobs to be used, along with a query sample drawn from an image sequence, the generative model is learned through an iterative process which cycles through the frames of the query sample until model convergence is achieved. The generative model models an image background using zero color blobs for modeling the image sequence representing the query sample, along with a number of color blobs for modeling one or more objects in query sample. The generative model is learned using a variational expectation maximization (EM) algorithm which continues until convergence is achieved, or alternately, until a maximum number of iterations has been reached.

In particular, in one embodiment an expectation step of the EM analysis maximizes a lower bound on a log-likelihood of each image frame by inferring approximations of variational parameters. Similarly, a maximization step of the EM analysis automatically adjusts model parameters in order to maximize a lower bound on a log-likelihood of each image frame. These expectation and maximization steps are sequentially iterated until convergence of the variational parameters and model parameters is achieved. As is well known to those skilled in the art, a variational EM algorithm is a probabilistic method which can be used for estimating the parameters of a generative model. Note that the process briefly summarized above for learning the generative models is described in detail below in Section 3.

Once the scene generative model is computed, it is then used to compute the likelihood of each frame of an image sequence as the cost on which video browsing, search and retrieval, and adaptive video fast forward is based. Further, in one embodiment, once learned, one or more generative models are stored to a file or database of generative models for later use in analyzing either the image or video sequence from which the query sample was selected, or one or more separate image sequences unrelated to the sequence from which the query sample was selected.

Turning now to a discussion of the aforementioned UI, user interaction with the image sequence analyzer begins by first providing or identifying the query sample. Again, this query sample consists of a sequence of one or more image frames representing a scene or sequence of interest. In one embodiment, the UI provides the capability to select a sequence of one or more frames directly from an image sequence or video as it is displayed on a computer display device. In another embodiment, once selected, the query sample is either automatically or manually saved to a computer storage medium for later use in searching either the same or different image sequences. In still another embodiment, a representative frame from the query sample is provided within the UI in a "query sample window." Alternately, a looped playback of the entire query sample is provided in the query sample window.

Given the query sample, the image sequence is searched to identify those image frames or frame sequences which are similar to the query sample, within a user adjustable similarity threshold. As the image sequence is automatically searched, static thumbnails representing matches to the query sample are presented via the UI in a "query match window." Each of these thumbnails is active in the sense that the user may select any or all of the thumbnails for immediate playback, printing, saving, etc., as desired. Note that in a related alternate embodiment, the results of the search are inverted such that the search returns those image frames or frame sequences which are dissimilar to the query sample, again within a user adjustable similarity threshold.

In addition, the user is provided with several features and options with respect to video playback in alternate embodiments of the UI described herein. For example, in one embodiment, as the aforementioned query-based similarity search is proceeding, a "playback window" will automatically play the video being search, so that the user can view the video sequence. However, the playback speed of that video is dynamic with respect to the similarity of the current frame to the query sample. In particular, as the similarity of the current frame or frame sequence to the query sample increases, the current playback speed of the video sequence will automatically slow towards normal playback speed. Conversely, as the similarity of the current frame or frame sequence to the query sample decreases, the current playback speed of the video sequence will automatically increase speed in inverse proportion to the computed similarity. In this manner, the user is provided with the capability to quickly view an entire video sequence, with only those portions of interest to the user being played in a normal or near normal speed.

In a related embodiment, a playback speed slider bar is provided via the UI to allow for real-time user adjustment of the playback speed. Note that as the playback speed automatically increases and decreases in response to the computed similarity of the current image frames, the playback speed slider bar moves to indicate the current playback speed. However, at any time, the user is permitted to override this automatic speed determination by simply selecting the slider bar and either decreasing or increasing the playback speed, from dead stop to fast forward, as desired.

Finally, in still another embodiment, a "video index window" is provided via the UI. The contents of the video index window are automatically generated by simply extracting thumbnail images of representative image frames at regular intervals throughout the entire video or image sequence. Further, in one embodiment, similar to the thumbnails in the query match window, the thumbnails in the video index window are active. In particular, user selection of any particular thumbnail within the video index window will automatically cause the playback window to begin playing the video from the point in the video where that particular thumbnail was extracted. In related embodiment, a video position slider bar is provided for indicating the current playback position of the video, relative to the entire video. Note that while this slider bar moves in real-time as the video is played, it is also user adjustable; thereby allowing the user to scroll through the video to any desired position. Further, in yet another embodiment, the thumbnail in the video index window representing the particular portion of the video which is being played is automatically highlighted as the corresponding portion of the video is played. The UI is described in further detail in Sections 2.3, with a discussion of a working example of the UI being provided in Section 5.4.

2.2 System Architecture of the Image Sequence Analyzer:

As noted above, the UI described herein is not limited to operation with the image sequence analyzer described herein. In fact, the UI described herein is capable of operating with any of a number of query-based image sequence search techniques, so long as the search technique used is capable of determining a similarity between a query sample and a target image sequence. However, for purposes of explanation, one particular embodiment of a query-based image sequence search technique is described below.

Figure 2:
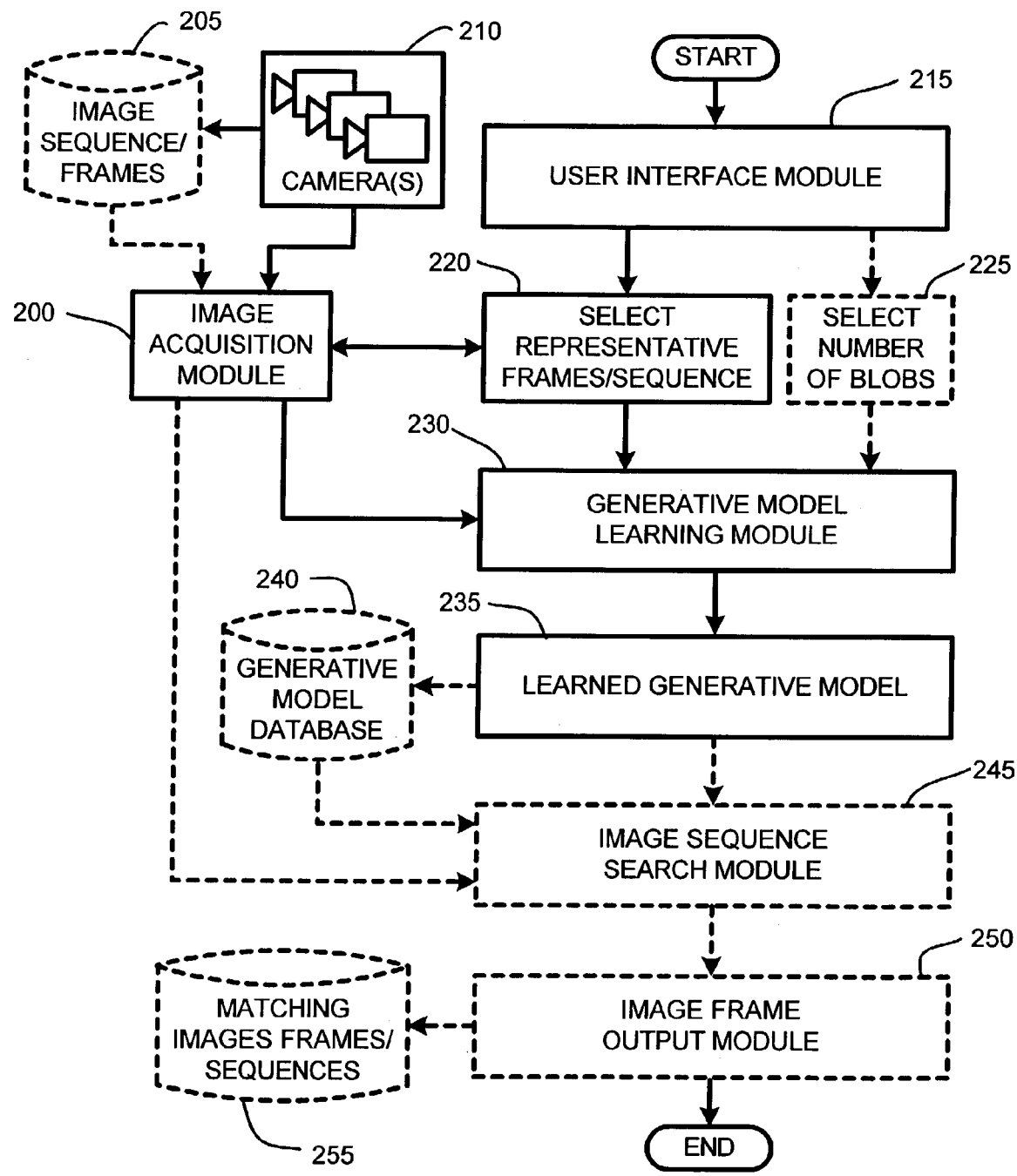
FIG. 2 illustrates an exemplary architectural diagram showing exemplary program modules for using generative models in an automatic fully adaptive content-based analysis of image sequences.

The general system diagram of FIG. 2 illustrates the processes generally described above for one possible implementation of the image sequence analyzer. In particular, the system diagram of FIG. 2 illustrates interrelationships between program modules for implementing the image sequence analyzer. Again, this image sequence analyzer uses computationally efficient scene generative models in an automatic fully adaptive content-based analysis of image sequences. It should be noted that the boxes and interconnections between boxes that are represented by broken or dashed lines in FIG. 2 represent alternate embodiments of the image sequence analyzer, and that any or all of these alternate embodiments, as described below, may be used in combination with other alternate embodiments that are described throughout this document.

In general, as illustrated by FIG. 2, in one embodiment, the use of scene generative models in an automatic fully adaptive content-based analysis of image sequences begins by using an image acquisition module 200 to read a sequence of one or more image frames 205 from a file or database, or alternately, directly from one or more cameras 210.

A user input module 215 is then used to access and view the image sequence using a conventional display device for the purpose of selecting a query sample 220 from the image sequence. As noted above, this query sample 220 represents a user selected sequence of representative image frames that are drawn from the image sequence 205. As described below, this query sample 220 is then used in learning the generative model. Further, in one embodiment wherein the aforementioned color blob-based generative model is used, the user input module 215 also allows a user to input or select a desired number of blobs 225.

Next, a generative model learning module 230 then begins an iterative variational expectation maximization process for learning a generative model 235 based on the input query sample 220 and the specified number of blobs 225. In general, as described in greater detail below, this iterative variational expectation maximization process operates by using a variational probabilistic inference to infer the parameters of the generative model 235. The iterative variational expectation maximization process performed by the generative model learning module 230 serves to decompose the input image frames of the query sample into individual components consisting of the generative model.

In general, the generative model decomposes the query sample into a background model and number of blob models. In particular, as described in greater detail below in Section 3, the generative model parameters for the embodiment using a color blob-based generative model include spatial covariance matrices of the blobs, blob color distribution parameters, blob sizes, and a scene background model. Note that the eigen values of the spatial covariance matrices of the blobs control the size of each blob. In combination, these components form a unique learned generative model 235 for the input query sample 220.

In one embodiment, the learned generative model 235 is then stored to a generative model database or file 240 for later use in analyzing one or more image sequences to identify image frames or sequences which are either similar, or conversely, dissimilar, to the image sequence of the query sample 220, as described in greater detail below.

Next, whether the learned generative model 235 is used immediately, or is simply stored 240 for later use, the generative model is then provided to an image sequence search module 245. The image sequence search module 245 then compares each frame of the image sequence 205 to the generative model 235 to determine a likelihood of the current image frame under the generative model. In other words, image sequence search module 245 uses the generative model 235 to compute a probability that each frame of the image sequence 205 was generated by the generative model. Given the probability computed by the image sequence search module 245, it is a then simple matter to determine whether the current image frame of the image sequence 205 is similar, or alternately, dissimilar, to the image sequence representing the query sample 220.

In particular, an image frame output module 250 simply compares the probability computed for each image frame by the image sequence search module 245 to a similarity threshold. If the probability is greater than the similarity threshold, then the image frame output module 250 identifies the current frame as a matching or similar image frame. Conversely, if the probability is less than or equal to the similarity threshold, then the image frame output module 250 identifies the current frame as a non-matching or dissimilar image frame. In either case, in one embodiment, the image frame output module 250 then stores either the matching or non-matching image frames, or pointers to those image frames to a file or database 255 for later use or review, as desired.

Note that in one embodiment (for example, see FIG. 8), the aforementioned similarity threshold is adjustable to allow for greater flexibility in identifying similar and dissimilar image frames.

Figure 3:
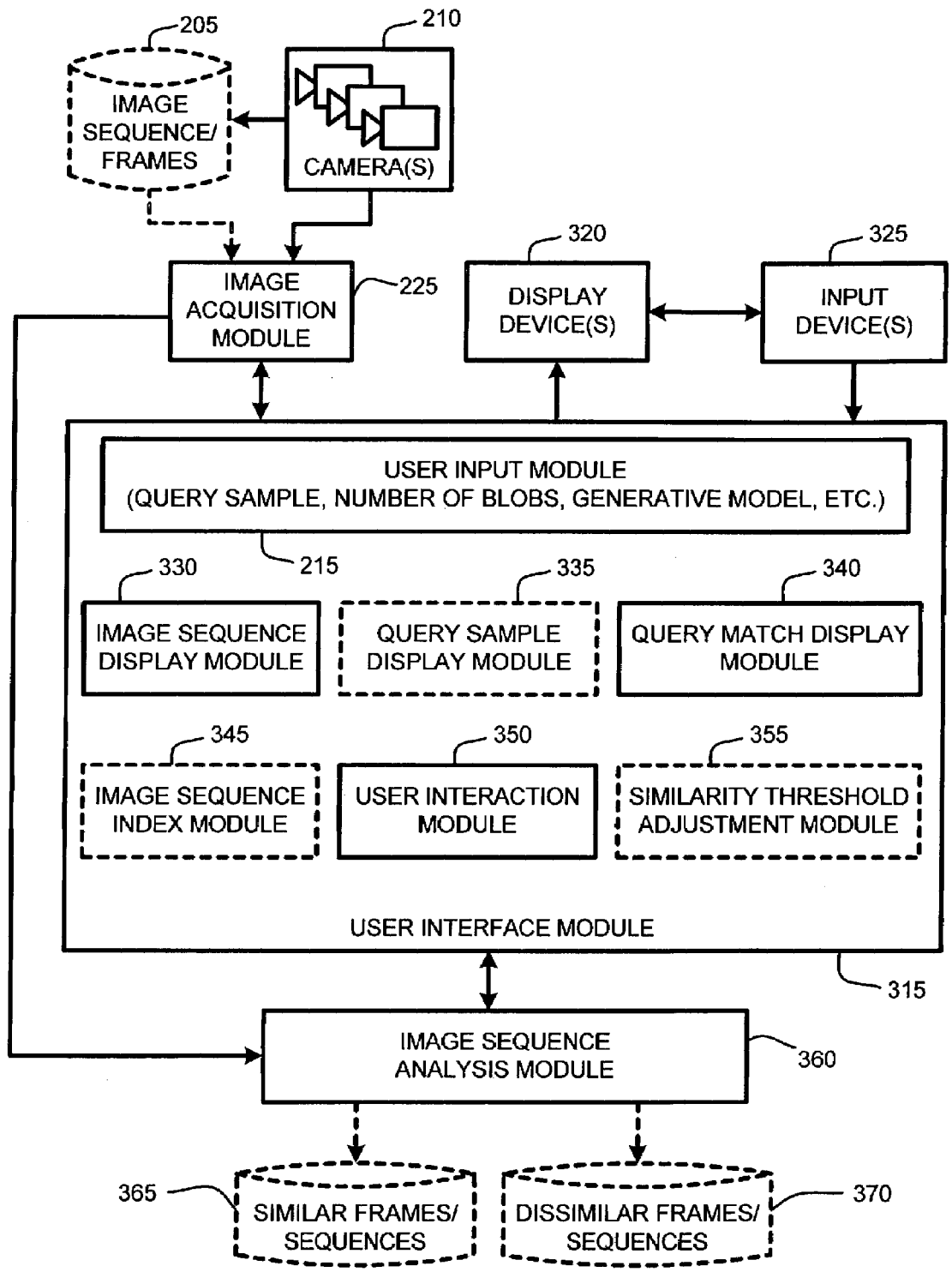
FIG. 3 illustrates an exemplary architectural diagram showing exemplary program modules for a user interface for providing user interaction with an automatic fully adaptive content-based analysis of image sequences.

2.3 System Architecture of the User Interface:

The general system diagram of FIG. 3 illustrates the processes generally described above with respect to the UI. Again, as noted above, the UI is not limited to interaction with the image sequence analyzer described in Section 2.2. In fact, the UI can be used any of a number of probabilistic modeling systems such as the query-based image sequence search technique described above, so long as the search technique used is capable of determining a similarity between a query sample and a target image sequence.

In particular, the system diagram of FIG. 3 illustrates interrelationships between program modules for implementing a user interface for adaptive video fast forward. It should be noted that the boxes and interconnections between boxes that are represented by broken or dashed lines in FIG. 3 represent alternate embodiments of the UI, and that any or all of these alternate embodiments, as described below, may be used in combination with other alternate embodiments that are described throughout this document.

In general, as illustrated by FIG. 3, a UI for interfacing with a probabilistic modeling system such as the image sequence analyzer described herein begins by using an image acquisition module 200 to read a sequence of one or more image frames 205 from a file or database, or alternately, directly from one or more cameras 210.

A user interface module 315 then provides a user with the ability to select a query sample from the image sequence 205 provided by the image acquisition module 200. As described above, this query sample is then used in learning a probabilistic generative model to be used in searching for similar or dissimilar image sequences or frames within the image sequence 205. However, in an alternate embodiment, once learned, the probabilistic module can be stored, as described above, and then recalled for use in searching any number of image sequences without the need to either select a query sample or to relearn a model for a selected query sample. In either case, once the generative model has been learned, the UI module 315 provides the user with automatic fully adaptive content-based interaction and variable-speed playback of the image sequence 205 with respect to either the user identified query sample, or the user selected generative model.

In particular, a user input module 215 is used by the UI module 315 to access, view and select all or part of the image sequence 205 using conventional display devices 320 and conventional input devices 325 (keyboard, mouse, etc.). Specifically, in one embodiment, the UI module 315 provides the capability to select a sequence (e.g., the query sample) of one or more frames directly from the image sequence 205 or video as it is displayed on the computer display device 320. An image sequence display module 330 displays a single or looped playback of the image sequence 205 using the display device 320. A user then selects start and end points within the image sequence 205, with the start and end points delimiting the query sample. In one embodiment, a query sample display module 335 displays either a representative frame from the selected query sample, or an image loop or video representing the extents of the selected query sample.

Once the query sample has been selected via the user interface module 315, the user input module 215 is used to input any additional parameters that may be necessary for learning a probabilistic model from the query sample. For example, using the generative model described above in Section 2.2, the user may input a desired number of blobs. Clearly, if other types of probabilistic models are used to compute or learn a generative model from the query sample, different, or even no inputs, may be required as input along with the selection of the query sample.

At this point, once the query sample and any additional parameters have been selected via the user input module 215, an image sequence analysis module 360 then learns the generative model from the query sample. Note that computation or learning of the generative model is accomplished as described above in Section 2.2, and in further detail in Section 3. Alternately, as noted above, in one embodiment, a previously computed generative model is simply loaded via the user interface module 315 rather then requiring the user to select a query sample. For example, in one embodiment, stored generative models are presented using either a representative image frame, or a short looping video sequence, such that users can immediately see the image sequence that was used to create the stored generative model. In this manner, user's can easily select a stored generative model that suits their needs. Further, if the stored generative models do not match the user's particular needs, then the user simply selects a query sample from the image sequence 205 as discussed above.

In either case, given the generative model, the image sequence analysis module 360 then operates to locate one or more sequences of image frames within the image sequence 205 that are similar to the query sequence, based on a comparison of those image frames to the generative model. Conversely, in an alternate embodiment, the image sequence analysis module 360 operates to locate one or more sequences of image frames within the image sequence 205 that are dissimilar to the query sequence, based on a comparison of those image frames to the generative model. Note that in one embodiment, a similarity threshold adjustment module 355 is provided within the user interface module 315. This similarity threshold adjustment module 355 provides the capability to increase or decrease a similarity threshold that is used in the comparison of the image sequence 205 to the generative model. In related embodiments, the image sequence analysis module 360 stores each identified sequence of similar image frames 365, or alternately, each identified sequence of dissimilar image frames 370 for later use as desired.

In one embodiment, a query match display module 340 then provides one or more image thumbnails representing matches to the query sample or selected generative model. Each thumbnail displays one or more representative image frames for each matched image sequence. Further, each of these thumbnails is active in the sense that the user may select any or all of the thumbnails for immediate playback, printing, saving, etc., as desired by interacting with a user interaction module 350 within the user interface module 315. For example, in one embodiment, where a user uses a pointing device to click on or otherwise select one of the thumbnails representing a query match, the image sequence associated with that thumbnail is played within a window on the display device 320. This playback can be either single or looped. The user interaction module 350 also provides a number of video controls such as play and stop controls, as well as a playback speed slider bar for interacting with video playback (for example, see FIG. 14).

Further, the user is provided with several additional features and options with respect to video playback in alternate embodiments of the UI module 315 described herein. For example, in one embodiment, as the aforementioned query-based similarity search is proceeding, a playback speed of the image sequence 205 is dynamic with respect to the similarity (or dissimilarity) of the current frame to the query sample or selected generative model. In particular, as the similarity (or dissimilarity) of the current frame or frame sequence to the query sample increases, the current playback speed of the video sequence will automatically slow towards normal playback speed. Conversely, as the similarity (or dissimilarity) of the current frame or frame sequence to the query sample decreases, the current playback speed of the video sequence will automatically increase speed in inverse proportion to the computed similarity. In this manner, the user is provided with the capability to quickly view an entire video sequence, with only those portions of interest to the user being played in a normal or near normal speed.

In a related embodiment, the aforementioned playback speed slider bar is provided via the UI module 315 to allow for real-time user adjustment of the playback speed of both the image sequence 205, or of image clips or sequences matching the query sample or the selected generative model. As noted above, in one embodiment, the playback speed automatically increases and decreases in response to the computed similarity of the current image frames. Further, the playback speed slider bar automatically moves to indicate the current playback speed. However, at any time, the user is permitted to override this automatic speed determination by simply selecting the slider bar and either decreasing or increasing the playback speed, from dead stop to fast forward, as desired, via the user interaction module 350.

As noted above, the image sequence display module 330 displays a single or looped playback of the image sequence 205 using the display device 320. Further, in one embodiment, an image sequence index module 345 automatically graphically indexes the image sequence 205 by extracting thumbnail images of representative image frames at regular intervals throughout the entire video or image sequence. Additionally, in one embodiment, these index thumbnails are active. In particular, user selection of any particular index thumbnail via the user interface module 315 will automatically cause the image sequence display module 330 to display a single or looped playback of the image sequence 205 from a point in the image sequence where that particular thumbnail was extracted.

In related embodiment, a video position slider bar is provided via the user interaction module 350 for indicating the current playback position of the video, relative to the entire video. Note that while this slider bar moves in real-time as the video is played, it is also user adjustable; thereby allowing the user to scroll through the video to any desired position. Further, in yet another embodiment, the thumbnail in the video index window representing the particular portion of the video which is being played is automatically highlighted as the corresponding portion of the video is played.

3.0 Operation Overview:

As noted above, the image sequence analyzer generally operates by using computationally efficient scene generative models in an automatic fully adaptive content-based analysis of image sequences. Specific details regarding implementation of the exemplary image sequence analyzer used by the UI are provided in Sections 3 and 4, followed by a discussion of a working example of the UI in Section 5.4.

3.1 Generative Models:

In general, as is well known to those skilled in the art, a generative model is a type of probabilistic model that may be used to generate hypothetical data. Ideally, this hypothetical data will either match, or approximate within acceptable limits, the data actually observed on the system modeled. For example, a generative model of an observed image scene may be used in an attempt to model or approximate that observed image scene. If a probability that the generative model could have actually produced the observed image scene is sufficiently large, then it can be said that the generative model sufficiently approximates the observed image scene, and that the observed image scene is therefore similar to the data on which the generative model was trained. Conversely, if the probability is sufficiently small, then it can be said that the generative model does not sufficiently approximate the observed image scene, and that the observed image scene is therefore dissimilar to the data on which the generative model was trained.

The UI described herein is based on the use of generative models for modeling the spatial layout of objects within the frames of an image sequence. In modeling this spatial layout, any of a number of features may be used, such as, for example, object appearance, texture, edge strengths, orientations, color, etc. However, it should be appreciated by those skilled in the art that the image sequence analyzer described herein is capable of working equally well with any of a number of types of scene generative models for modeling the spatial layout of a sequence of images, and that the image sequence analyzer is not limited to use of the color-based scene generative models described herein. Further, and more importantly, the UI described herein is not limited to the exemplary image sequence analyzer described herein. In fact, the UI is capable of working with any type of generative model that performs a probabilistic comparison between a query sample and one or more image sequences.

As noted above, any of a number of generative models may be adapted for use by the image sequence analyzer described herein. However, for ease of explanation, the following discussion will focus on the use of R, G, and B (red, green and blue) color channels in the frames of an image sequence, i.e. the "query sample," for use in learning scene generative models for modeling the spatial layout of objects in the frames of the image sequence. In particular, objects in the query sample are modeled using a number of probabilistic color "blobs." In one embodiment, the number of color blobs used in learning the scene generative model is fixed, while in alternate embodiments, the number of color blobs to be used is provided either as an adjustable user input, or is automatically probabilistically estimated. As described in further detail below, given this color blob-based generative model, the model parameters include spatial covariance matrices of the blobs, blob color distribution parameters, blob sizes, and a scene background model.

3.1.1 Variational Expectation-Maximization for Generative Models:

In general, as is well known to those skilled in the art, an EM algorithm is often used to approximate probability functions such as generative models. EM is typically used to compute maximum likelihood estimates given incomplete samples. In the expectation step (the "E-Step"), the model parameters are assumed to be correct, and for each input image, probabilistic inference is used to fill in the values of the unobserved variables, e.g., spatial covariance matrices of the blobs, blob color distribution parameters, blob sizes, and a scene background model. In the maximization step (the "M-Step"), these model parameters are adjusted to increase the joint probability of the observations and the filled in unobserved variables. These two steps are then repeated or iterated until convergence of the generative model is achieved.

In fact, for each input image, the E-Step fills in the unobserved variables with a distribution over plausible configurations (the posterior distribution), and not just over individual configurations. This is an important aspect of the EM algorithm. Initially, the parameters are a very poor representation of the data. So, any single configuration of the unobserved variables (e.g., the most probable configuration under the posterior) will very likely be the wrong configuration. The EM algorithm uses the exact posterior in the E-Step and maximizes the joint probability with respect to the model parameters in the M-Step. Thus, the EM algorithm consistently increases the marginal probability of the data, performing maximum likelihood estimation.

However, in some cases, the joint probability cannot be directly maximized. In this case, a variational EM algorithm uses the exact posterior in the E-Step, but just partially maximizes the joint probability in the M-Step, e.g., using a nonlinear optimizer. The variational EM algorithm also consistently increases the marginal probability of the data. More generally, not only is an exact M-Step not possible, but computing the exact posterior is intractable. Thus, variational EM is used to learn the model parameters from an image sequence representing the query sample. The variational EM algorithm permits the use of an approximation to the exact posterior in the E-Step, and a partial optimization in the M-Step. The variational EM algorithm consistently increases a lower bound on the marginal probability of the data. As with EM algorithms, variational EM algorithms are also well known to those skilled in the art.

3.1.2 Generative Scene Models:

The color blob-based generative model described herein, is based on a generation of feature vectors $f_c(i,j)$, where c is one of C features modeled for each pixel i,j. These features can include texture, edge strengths, orientations, color, intensity, etc. However, for purposes of explanation, the following discussion will be limited to R, G and B color channels. As illustrated by FIG. 4B, the image features can be generated from several models indexed by s. Note that while not required, for computational efficiency, only one of the blob models (s=0) is used to model each pixel with a separate mean and variance in each color channel to provide a background model, while the rest of the objects in the image frames are modeled as blobs. Note that these blobs have spatial and color means and variances that apply equally to all pixels.

Figure 4A:
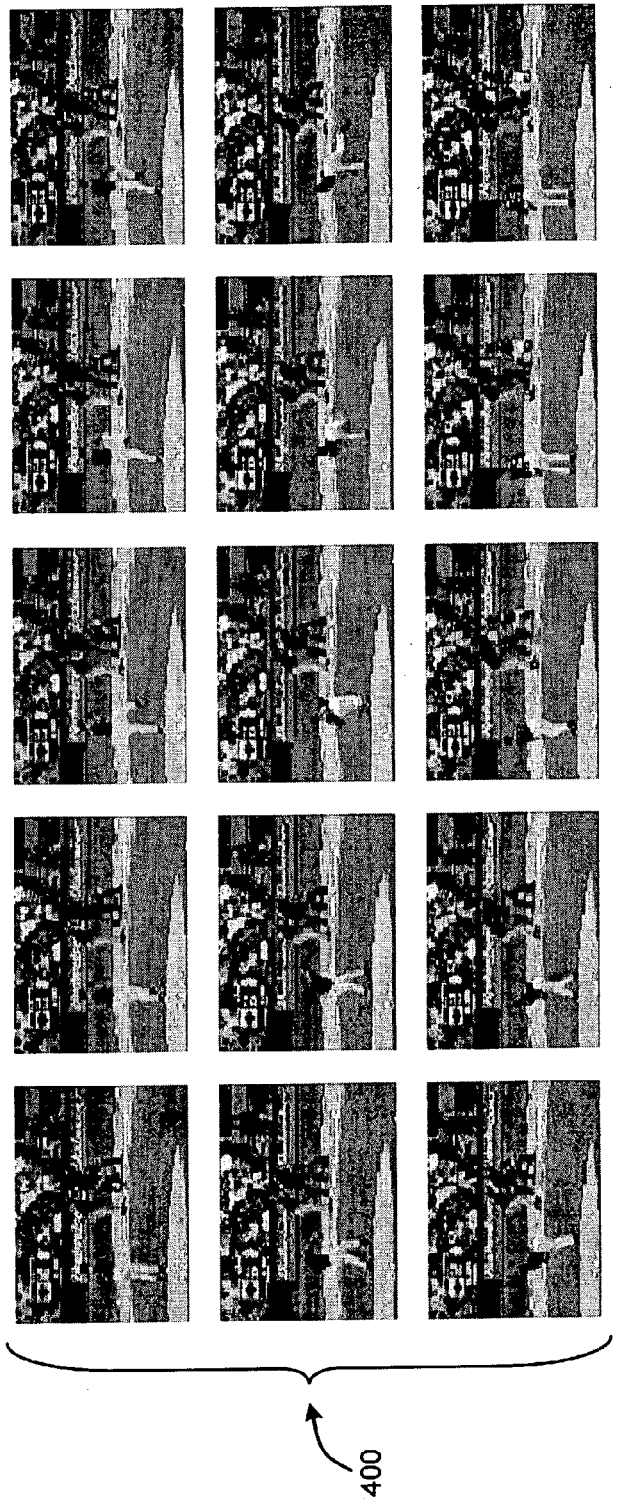
FIG. 4A illustrates an exemplary set of image frames used in learning a generative model.
Figure 4B:
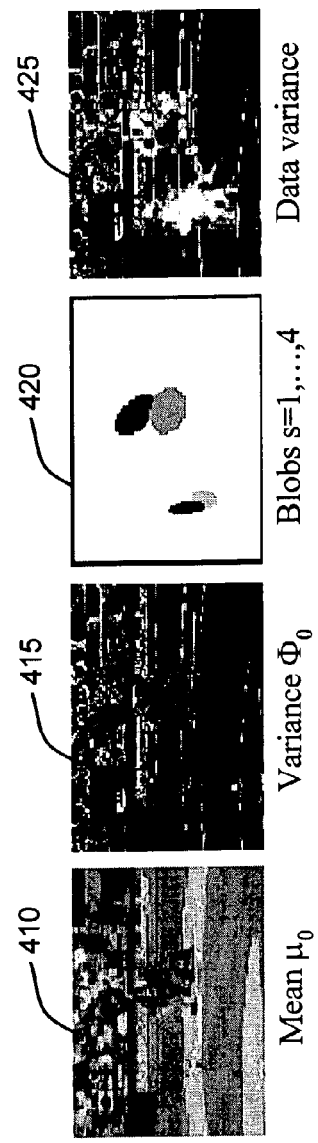
FIG. 4B illustrates the spatial layout of background and foreground objects learned from the image frames of FIG. 4A using blobs as object models.

For example, FIG. 4A shows several frames 400 from a five-second clip of pitching in a professional baseball game, while FIG. 4B shows the spatial layout of background and foreground objects learned from the frames 400 using four blobs as object models 420. While four blobs were chosen for this example, it should be noted that this number has no particular significance. Specifically, blob models 420 capture the foreground object and thus, as illustrated by 410 the pitcher is automatically removed from the mean background. Note the difference in the variance of the learned background 415 and the pixel variances 425 learned from the frames 400.

In learning the generative models, pixel generation is assumed to start with the selection of the object model s, by drawing from the prior p(s), followed by sampling from appropriate distributions over the space and color according to p([i j]|s) and p($g_c$(i,j), |s,i,j), where:

$p([i j]|s=0) = u$(uniform distribution)     Equation 1

$p([i j]|s \neq 0) = N([i j]^T; \gamma_s, \Gamma_s)$     Equation 2

$p(g_c|s=0, i,j) = N(g_c; \mu_{0,c}(i,j), \Phi_{0,c}(i,j))$     Equation 3

$p(g_c(i,j)|s \neq 0, i,j) = N(g_c; \mu_{s,c}, \Phi_{s,c})$     Equation 4 where N denotes a Gaussian (normal) distribution.

As noted above, FIG. 4B illustrates mean and variance images $\mu_{0,c}$(i,j) and $\Phi_{0,c}$(i,j), 410 and 415 respectively, for the model s=0, which captures a background of the scene. Note that in FIG. 4B, the variances, 415 and 425, are shown in gray intensities for easier viewing, although they are actually defined in the RGB color space. The blobs are illustrated by showing all pixels within a standard deviation along each principal component of $\Gamma_s$ painted in the mean color $\mu_{s,c}$ where c is the color channel (R, G or B). Further, although not illustrated by FIG. 4B, the blobs 420 also have a color covariance matrix $\Phi_{s,c}$.

After generating the hidden pixel $g_c$(i, j), it is then shifted by a random shift (m,n) to generate a new pixel $f_c$(i',j')=$f_c$(i+m,j+n)=$g_c$(i,j), i.e., $p(f_c, g_c) = \delta(f_c - g_c); p(i',j'|i,j,m,n) = \delta(i+m-i', j+n-j')$     Equation 5

The images are then assumed to be generated by repeating this sampling process K times, where K is the number of pixels, and an image sequence is generated by repeating the image generation T times, where T is the number of frames in the image sequence. There are several variants of this model, depending on which of the hidden variables are shared across the space, indexed by pixel number k, and time indexed by t. Note that in the data there is a 1-to-1 correspondence between pixel index k and the position (i', j'), which is the reason why the coordinates are not generated in the models. However, in order to allow the blobs to have their spatial distribution, it is necessary to treat coordinates as variables in the model, as well. Consequently, the generative model creates a cloud of points in the space-time volume that in case of the real video clips or image sequences fill up that space-time volume.

Camera shake in an image sequence is modeled as an image shift, (m,n). The camera shake is best modeled as varying through time, but being fixed for all pixels in a single image. It makes sense to use a single set of parameters for detailed pixel model s=0, as this model is likely to focus on the unchanging background captured in $\mu_{0,c}$. The changes in the appearance of the background can be well captured in the variance $\Phi_{0,c}$ and the camera shake (m,n). However, the blob parameters $\gamma_s$, $\Gamma_s$ can either be fixed throughout the sequence or allowed to change, thus tracking the objects not modeled by the overall scene model $\mu_{0,c}$(i,j), and $\Phi_{0,c}$(i,j).

In one embodiment, the blob spatial variances $\Gamma_s$ are kept fixed, thus regularizing the size of the object captured by the model, while letting $\gamma_s$ vary through time, thereby allowing the object to move without changing drastically its size. Note that due to the statistical nature of the blob's spatial model, it can always vary its size, but keeping the variances fixed limits the amount of the change. In this version of the model, $\gamma_s$ becomes another set of hidden variables, for which a uniform prior is assumed. Thus, the joint likelihood over all observed and unobserved variables is:

$p(\{\{s_{k,t}, i_{k,t}, j_{k,t}, i'_{k,t}, j'_{k,t}, g_{c,k,t}, f_{c,k,t}\}_{k=1,\ldots,K}; \gamma_{s,t}, m_t, n_t\}_{t=1,\ldots,T})$     Equation 6 which can be expressed as the product of the appropriate terms in Equations 1 through 5 for all k,t. The joint likelihood is a function of the model parameters $\theta$ that include the spatial covariance matrices of the blobs $\Gamma_s$, the blob color distribution parameters, $\mu_{s,c}$, and $\Phi_{s,c}$, the scene background model $\mu_{0,c}$(i,j) and $\Phi_{0,c}$(i,j), and the blob sizes $\Gamma_s$. To compute the likelihood of the data f(i',j'), all other hidden variables $h = \{s_{k,t}, i_{k,t}, j_{k,t}, i_{k,t}', j_{k,t}', g_{c,k,t}, f_{c,k,t}, \gamma_{s,t}, m_t, n_t\}$ need to be integrated out, which can be efficiently done with the help of an auxiliary function q(h), that plays the role of an approximate or an exact posterior:

$\log p(f) = \int_h p(f,h) dh = \log \int_h q(h) p(f,h)/q(h) dh \geq \int \log \int hd$
$hq(h)[\log p(f,h) - \log q(h)] = B(\psi, \theta)$     Equation 7 where $\theta$ represents the model parameters and $\psi$ represents the parameters of the auxiliary function q. The above bound is derived directly from "Jensen's inequality," which is well known to those skilled in the art. When q has the same form as the exact posterior q(h|f), the above inequality becomes equality and optimizing the bound B with respect to $\psi$ is equivalent to Bayesian inference. If a simplified form of the posterior q is used, then $\psi$ can still be optimized for, thus getting q as close to the true posterior as possible. In particular, the following assumptions are made: 1) a factorized posterior with simple multinomial distributions on segmentation s and transformation m,n; a Gaussian distribution on g; and a Dirac (impulse) on i,j, since the observed i',j' together with the shift m,n uniquely define i,j. Thus, $q = \Pi_t q(\gamma_{s,t}) q(m_t, n_t) \Pi_{i,j} q(s_t) \delta(i+m-i', j+n-j') \times N(g_c; v_t(i,j), \theta_t(i,j))$     Equation 10

Figure 5:
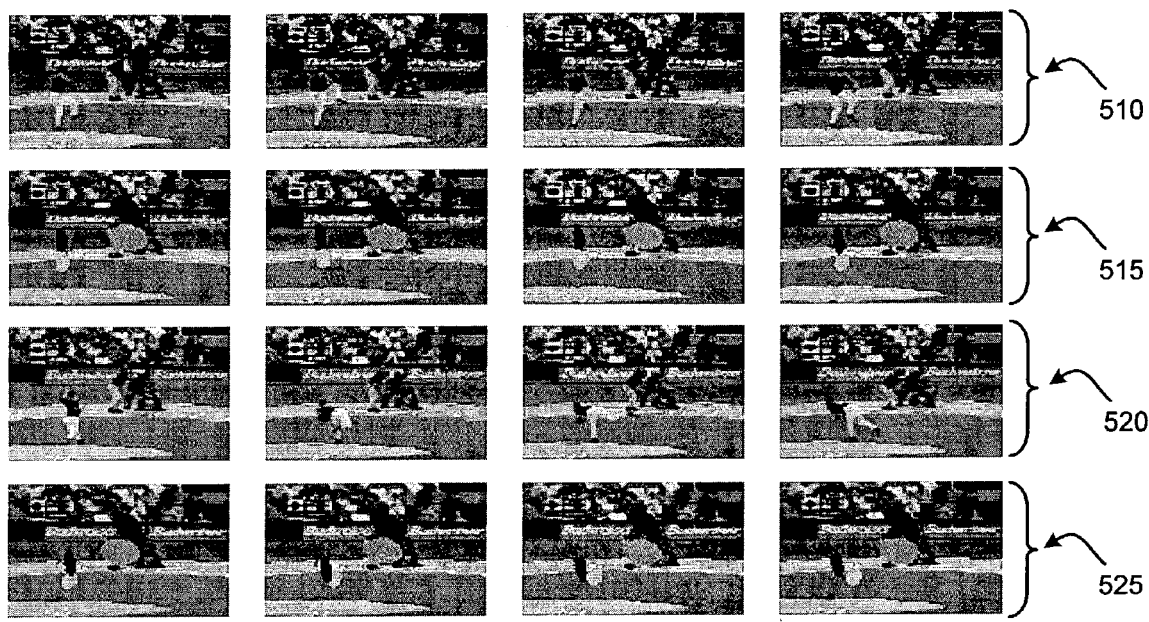
FIG. 5 illustrates the results of the inference with respect to several image frames using the model shown in FIG. 4B.

As noted previously, inference is performed by solving $\partial B/\partial \psi = 0$ where $\psi$ includes the mean and variance of latent images g, v(i,j), $\theta$(i,j); and the values of the discrete distributions q(s,(i,j)), q($m_t, n_t$) and q($\gamma_{s,t}$). For example, FIG. 5 illustrates the results of the inference on $\gamma_{s,t}$ using the model shown in FIG. 4B. In particular, FIG. 5 illustrates inferred blob positions $\gamma_{s,t}$ (second and fourth row, 515 and 525, respectively) in 8 frames of the video sequence 400 of FIG. 4A (first and third row, 510 and 520, respectively) using the model illustrated in FIG. 4B.

To perform learning from a query sample, the bound optimizations are alternated with respect to the inference parameters $\psi$ and model parameters $\theta$ as illustrated by the following iterative variational EM procedure:

(0) Initialize parameters randomly.
(1) Solve $\partial B/\partial \psi = 0$, keeping $\theta$ fixed.
(2) Solve $\partial B/\partial \theta = 0$, keeping $\psi$ fixed.
(3) Loop steps 1 and 2 until convergence.

For the color blob-based model described herein, this variational EM procedure is very efficient, and typically converges in 10 to 20 iterations, while steps (1) and (2)

above reduce to solving linear equations. In a tested embodiment, the model parameters for a 150-frame query sample image sequence are typically learned in a few iterations. As noted above, FIG. 4B provides an example of a learned generative model.

As noted above, the model parameters are initialized randomly, or in an alternate embodiment, using a first order fit to the data perturbed by some noise. Further, the iterative procedure described above provides improvement of the bound in each step, with eventual convergence, but does not provide a global optimality. Consequently, with such models, the issue of sensitivity to initial conditions can be of concern. However, although the model captures various causes of variability, the model's purpose is to define a likelihood useful for a search engine of some sort, rather than to perform perfect segmentation or tracking. Due to the structure of the model that describes various objects, their changing appearance, positions and shapes as well as potential camera shake, the training usually results in a reasonable explanation of the scene that is useful for detecting similar scenes. In other words, the model's ability to define the measure of similarity is much less sensitive to the initial conditions.

3.2 Scene Mixtures:

The parameters of the generative model can be allowed to change occasionally to represent significant changes in the scene. Keeping the same generative framework, this functionality can be easily added to the image sequence analyzer described herein by adding a "scene class variable" c (not to be confused with the color channels in the previous section), and using multiple sets of model parameters $\theta_c$ describing various scenes. The joint likelihood of the observed frame and all the hidden variables is then provided by Equation 11 as:

$$p(c,h,f)=p(c)p(h,f|\theta_c) \quad \text{Equation 11}$$

Figure 6:
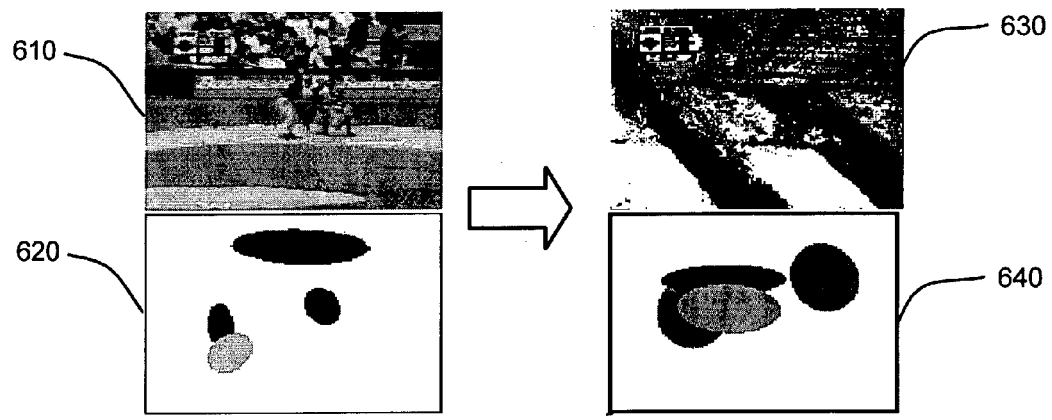
FIG. 6 illustrates the use of a mixture of different scenes, i.e., a pitching scene and a green field, for training a scene mixture model.

This model can be used to automatically cluster the frames in a video or image sequence. In particular, to capture some of the temporal consistencies at various time scales, a class index c, camera movement m,n, the blob positions $\gamma_s$ and even the segmentation s(i,j) are conditioned on the past values. The parameters of these conditional distributions are learned together with the rest of the parameters. The most interesting of these temporal extensions is the one focused on scene cluster c, as it is at the highest representational level. For example, as illustrated by FIG. 6, a pitching scene 610, with blob model 620, when followed by a shot of a green field 630, is likely to indicate a play such as a hit ball. Consequently, training a mixture of two scenes on a play using a temporal model is illustrated by Equation 12 as:

$$p(c_t,h_t,f_t)=p(c_t|c_{t-1})p(h_t,f_t|\theta_{ct}) \quad \text{Equation 12}$$

The inference and learning rules for this mixture are derived in the same way as described above in Section 3.1.2 for the single scene generative model. Further, a well known solution to such inference is known in Hidden Markov Model (HMM) theory as "Baum-Welch" or "forward-backward algorithms." As such solutions are well known to those skilled in the art, they will not be described in further detail herein.

4.0 System Operation of the Image Sequence Analyzer:

As noted above, the program modules described in Section 2.2 with reference to FIG. 2, and in view of the detailed description provided in the preceding Sections, are employed in an "image sequence analyzer" which uses computationally efficient scene generative models in an automatic fully adaptive content-based analysis of image sequences. As described above, this image sequence analyzer provides the underlying computational processes for enabling the UI described above in Section 2.3, and illustrated below in Section 5. These processes are depicted in the flow diagrams of FIG. 7 and FIG. 8. In particular, FIG. 7 illustrates an exemplary process for learning generative models based on a query sample input, while FIG. 8 illustrates an exemplary process for using the learned generative models in searching one or more input image sequences to identify similar, or dissimilar, image frames.

Figure 7:
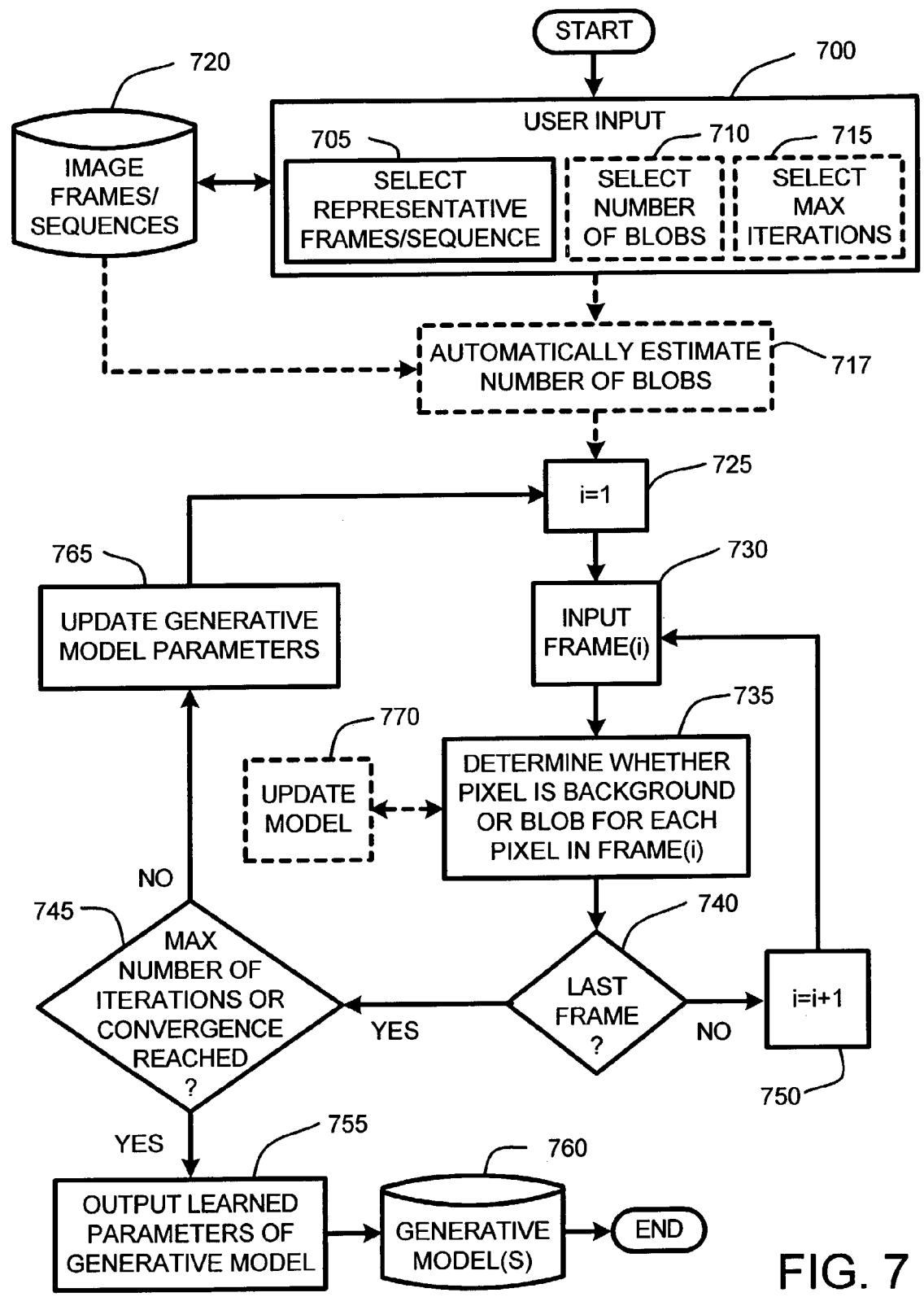
FIG. 7 illustrates an exemplary process for learning generative models based on a query sample input.
Figure 8:
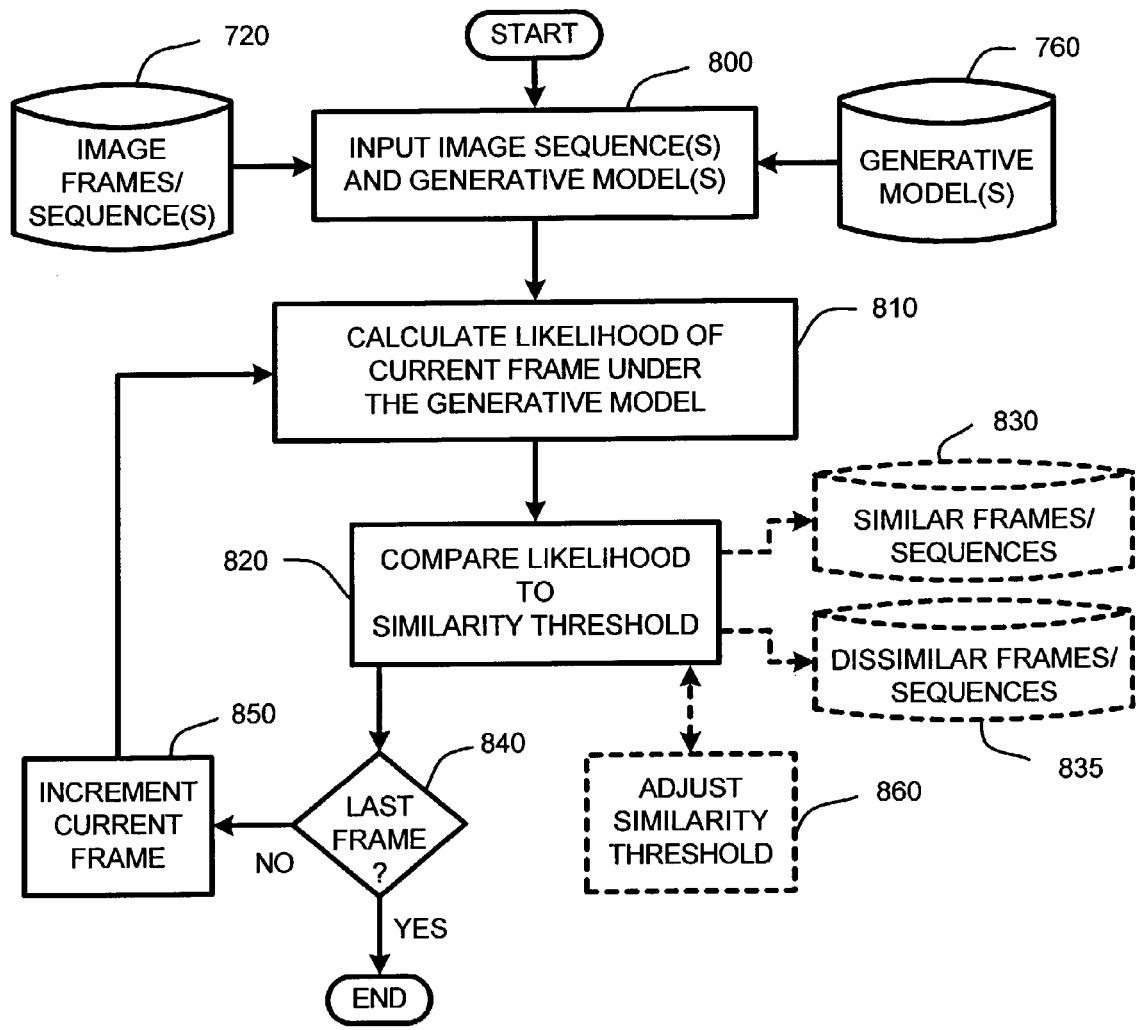
FIG. 8 illustrates an exemplary process for using learned generative models in searching one or more input image sequences to identify either similar or dissimilar image frames.

It should be noted that the boxes and interconnections between boxes that are represented by broken or dashed lines in FIG. 7 and FIG. 8 represent alternate embodiments of the image sequence analyzer, and that any or all of these alternate embodiments, as described below, may be used in combination with other alternate embodiments as described throughout this document.

Referring now to FIG. 7 in combination with FIG. 2, the process can be generally described as system for learning color blob-based generative models for use in an automatic fully adaptive content-based analysis of image sequences. In general, as illustrated by FIG. 7, the image sequence analyzer begins by reading a sequence of one or more image frames 720. As discussed above, these image frames are obtained in alternate embodiments from a file, database, or imaging device.

Once the image sequence 720 has been input, user input 700 is collected in order to begin the process of learning a generative model from a query sample chosen from the image sequence 720. In particular, the user input includes selecting a representative sequence (i.e., the query sample) of image frames 705 to be used for learning the generative model. In addition, in one embodiment, the user input also includes selecting, specifying or otherwise identifying a number of blobs 710 to be used in modeling the query sample. However, as noted above, in another embodiment, the number of color blobs is automatically estimated 717 from the data using conventional probabilistic techniques such as, for example, evidence-based Bayesian model selection and minimum description length (MDL) criterion for estimating a number of blobs from the selected image sequence. Such probabilistic estimation techniques are well known to those skilled in the art, and will not be described in further detail herein.

Finally, in another embodiment, the user input also includes selecting, specifying or otherwise identifying a maximum number of iterations 715 to perform during the variational EM procedure used to learn the generative model. Selection or identification of a maximum number of iterations 715 is useful in the rare event that convergence is not achieved in a reasonable number of variational EM iterations when attempting to learn the generative model from the query sample.

Given the aforementioned user input 700, and in some embodiments, the automatically estimated number of blobs 717, the next step is to initialize a counter i to 1 725, with i representing the current frame in the query sample. The $i^{th}$ frame of the query sample is then input 730 from the image sequence 720. Next, as a part of the variational EM process, a determination 735 is made for each pixel in the current image frame as to whether each pixel represents either a background pixel, or alternately a blob pixel. Next, a check is made to see if the current image frame is the last frame 740 of the query sample. If the current image frame is not the last frame of the query sample, the counter i is incremented 750, and the next frame of the query sample is input from the image sequence 720. The process of inputting the next image frame from the query sample 730 and then using the variational EM process to determine 735 whether each pixel in the current image frame represents either a background pixel, or a blob pixel.

Once the last frame has been examined 735, a determination is made as to whether either a maximum number of iterations has occurred or whether model convergence 745 has been achieved as described above. If model convergence 745 has been achieved, then the generative model parameters are simply output 755, and if desired, stored for later use 760. However, if convergence has not been achieved, and a maximum desired number of iterations has not been reached, then the generative model parameters are updated 765 with the current parameter values being used to define the generative model, and a second pass through the image frames in the query sample is made in exactly the same manner as described above. However, with the second and subsequent passes through the query sample, the generative model gets closer to convergence as the model parameters are updated 765 with each pass. Note that in another embodiment, the image sequence analyzer uses conventional on-line probabilistic learning techniques for updating model parameters 770 after each image frame is processed rather then waiting until the entire representative image sequence has been processed as described above.

These iterative passes through the query sample then continue until either convergence is reached 745, or until the maximum desired number of iterations has been reached. Again, as noted above, at this point, the current generative model parameters are simply output 755, and if desired, stored for later use 760.

Next, as illustrated by FIG. 8, once the generative model has been learned, either as described above, or by any other means, the generative model 860 is then input 800 along the image sequence 720 to be analyzed by the image sequence analyzer. Each frame in the entire image sequence 720, starting with the first frame of the image sequence, is then compared to the generative model to determine a likelihood 810 for each frame under the generative model. This likelihood is then compared 720 to a similarity threshold for purposes of determining the approximate similarity of the query sample to the current image frame. As described above, in alternate embodiments, either similar image frames 830, or dissimilar image frames 835 are then stored to files or databases for later browsing or review by the user. Note that in one embodiment, the aforementioned similarity threshold is adjustable 860 to allow for greater flexibility in identifying similar and dissimilar image frames.

Next, a determination is made as to whether the last frame of the image sequence 720 has been compared to the generative model. If the current frame is the last frame 840, then the process is ended. However, if the current image frame is not the last image frame of the image sequence 720, then the frame count is simply incremented by one, and the likelihood of the next image frame under the generative model is calculated 810. Again, the likelihood of this next image frame is compared to a similarity threshold to determine whether or nor that image frame is similar to the image frames representing the query sample. This process then continues, with the current frame continuously being incremented 850, until the last image frame of the image sequence 720 has been reached.

5.0 Tested Embodiments:

The following sections describe several uses of the image sequence analyzer with respect to the aforementioned user interface. In particular, the following sections describe using the UI with the image sequence analyzer for likelihood based variable speed fast forwarding through an image sequence, searching through an image sequence using likelihood under the generative model, and finally, identifying unusual events in an image sequence, again using likelihood under the generative model.

5.1 Intelligent Fast Forward:

In a tested embodiment of the image sequence analyzer, the learned generative models described above were used to create an image frame similarity-based intelligent fast forward application. In general, the approach to intelligent image or video fast forwarding is based on using the likelihood of the current frame under the generative model to control the playback speed. In portions of the image sequence having a lower likelihood under the generative model, the playback speed of the image sequence is increased. Conversely, as the likelihood of the current frame under the generative model increases, the playback speed is decreased, thereby providing increased viewing time for portions of the image sequence which are more similar to the query sample. This has the advantage of using a familiar interface to searching through video, e.g., the fast forward button, while the danger of fast forwarding over interesting content is reduced. In such a system, the user can still have the control over the fast forward speed, thus reducing the dependence on the automatic media analysis.

Clearly there are many ways of implementing the playback speed/frame similarity relationship. For example, in one embodiment, the fast forward speed is denoted by V, with a functional relationship between this speed and the likelihood under the generative model being determined by Equation 13:

$$V_t = r(\log p(f_t)), \text{ or}$$

$$V_t = r(\log p(\{f_u\}_{u=t,\ldots,t+\Delta t})) \qquad \text{Equation 13}$$

where r is a monotone non-increasing function. Note that the second form of Equation 13 is useful when the likelihood model is defined on a single frame and not on an image sequence as described in the previous section. Further, the second form of Equation 13 is also generally preferable because of it provides the power to anticipate a change and gently change the speed around the boundaries of the interesting frames. This is especially useful if the user is trying to extract a clip or image sequence from a larger video or image sequence in order to compile a collection of image frames as a summary, for instance. Such a need is typical in personal media usage.

Figure 9A:
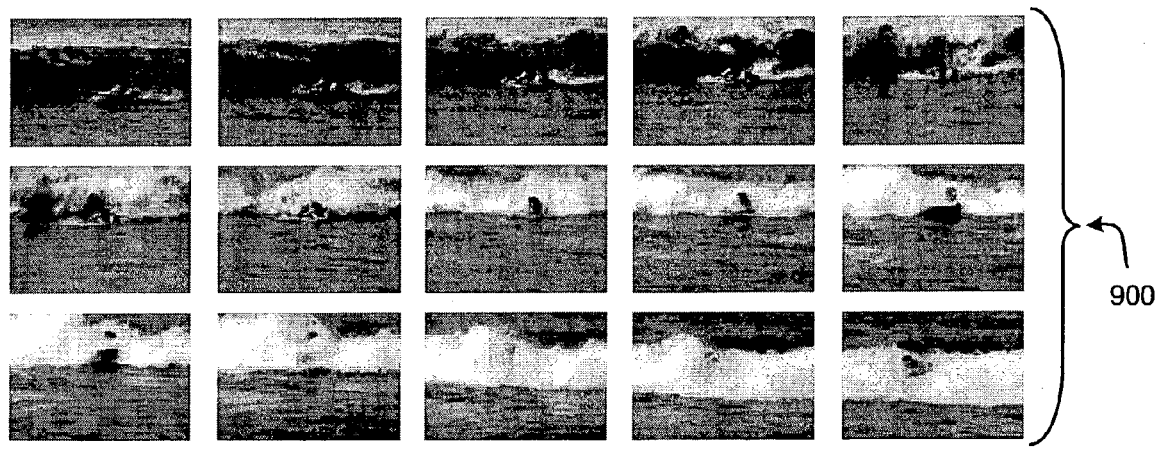
FIG. 9A illustrates a number of image frames from an image sequence that were used as a query sample for training generative models in a working embodiment of the image sequence analyzer.
Figure 9B:
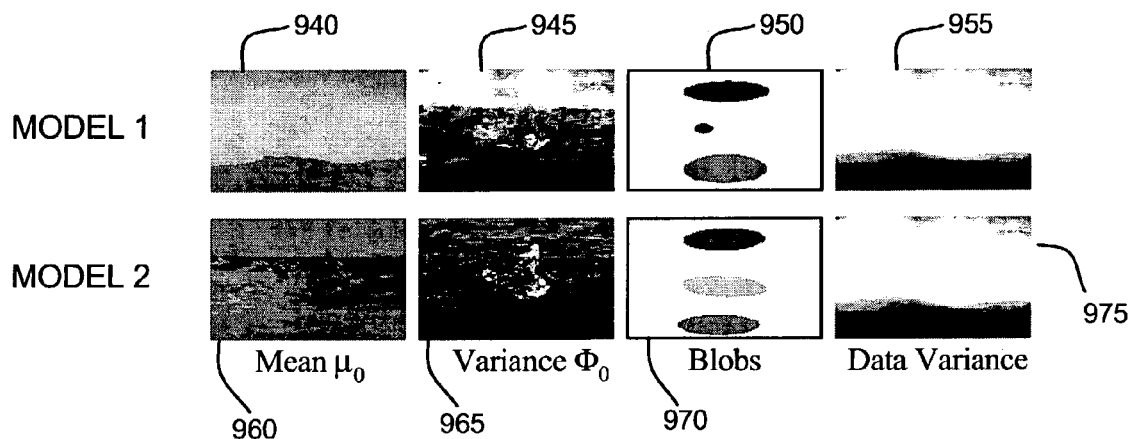
FIG. 9B illustrates two alternate generative models that were learned from the same image sequence represented from FIG. 9A by using different initial conditions for learning each alternate model.

5.2 Searching with the Generative Model:

The generative model can balance causes of variability in various ways to design a good likelihood-based measure of similarity. For example in a tested embodiment of the image sequence analyzer, two alternate generative models of "boogie-boarding" were learned given different initial conditions as illustrated in FIG. 9A and FIG. 9B. However, both generative models were observed to capture the variability in the data in a reasonable way and have created similar generalizations. They are also equally effective in searching for similar image sequences. In particular, FIG. 9A illustrates a number in image frames 900 from an image sequence that were used as a query sample for training two generative models using different initial conditions. As illustrated by FIG. 9B, the first model (see 940 through 955) uses a detailed pixel-wise model s=0 to capture the wave's foam and two blue blobs (see 950) to adjust the appearance of the ocean in the absence of the foam. The third blob (see 950) is modeling a boogie-border. In contrast, the second model has placed the boogie boarder against a foam-free ocean into a detailed appearance model s=0, and uses the three blobs (see 970) to model the foam as well as the darker and lighter blue regions of the ocean.

Figure 10:
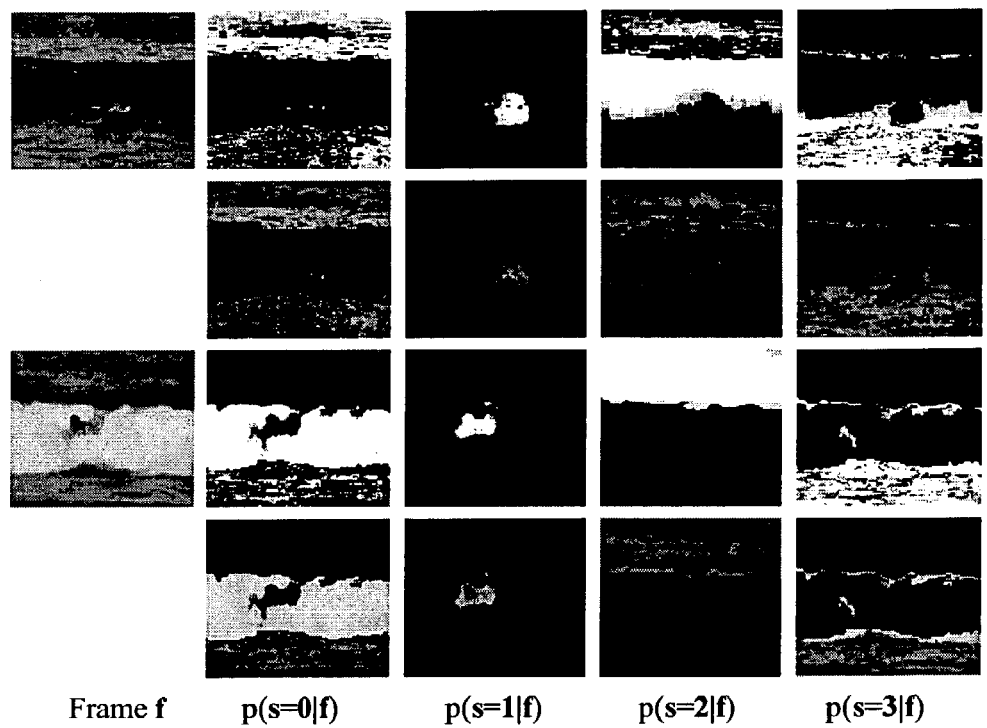
FIG. 10 illustrates the results of inference using a first model illustrated by FIG. 9B.
Figure 11:
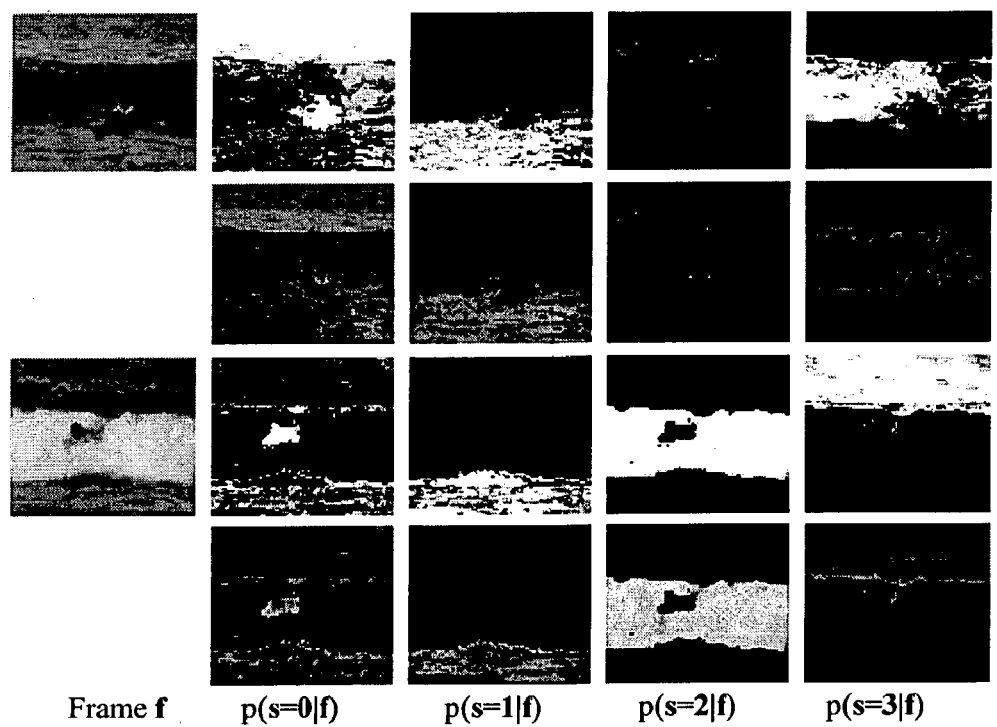
FIG. 11 illustrates the results of inference using a second model illustrated by FIG. 9B.

FIG. 10 and FIG. 11 illustrate how these two models understand two very different frames from the sequence. However, while the two models place objects into significantly different components s, they are both provide a reasonably good fit to the data and a high likelihood for both frames. For example, FIG. 10 illustrates inference using model 1 from FIG. 9B on two very different frames shown in the first column. The rest of the columns show segmentation, i.e., posterior probability maps q(s(i,j)). The color images in each of the other rows show the segmentation q(s) multiplied with the frame to better show which regions were segmented. Similarly, FIG. 11 illustrates inference using model 2 from FIG. 9B on the same two image frames provided in the first column of FIG. 10. Again, the remaining columns show segmentation, i.e., the posterior probability maps q(s(i,j)). The color images in every other row show the segmentation q(s) multiplied with the frame to better show which regions were segmented.

Note that these FIGS., 9A through 11, illustrate the indifference to a particular explanation of the data in contrast to a conventional bottom-up approach which compares two video segments by comparing two extracted structures, thus potentially failing if the system happens to extract the components in a consistent fashion.

5.3 Detecting Unusual Events in an Image Sequence:

In one embodiment, if an event of interest is buried in a long segment of uninteresting material, the search strategy detailed above can be reversed and a single or mixed scene model can be trained on the query sample and the search criteria can then be defined in terms of finding video segments that are unlikely under the model.

Figure 12A:
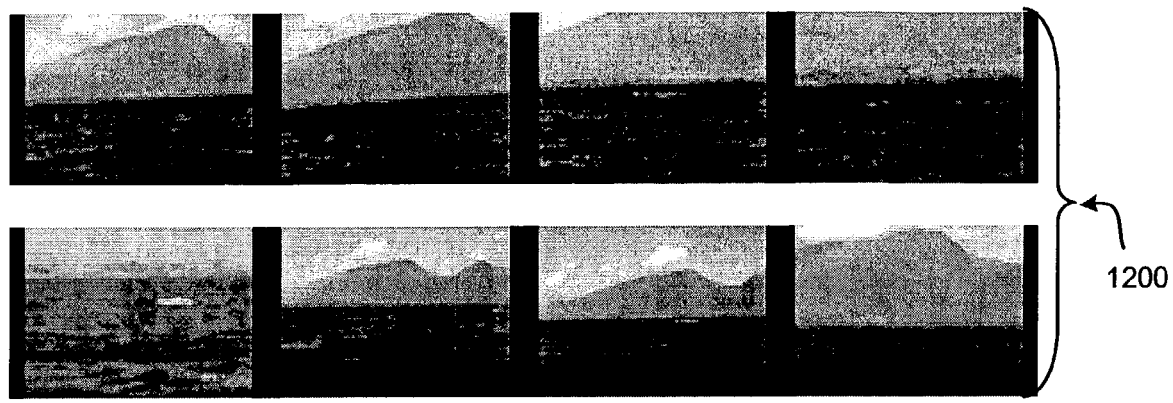
FIG. 12A illustrates a short sequence of image frames from a video sequence of a boat ride as examined in a tested embodiment of the image sequence analyzer
Figure 12B:
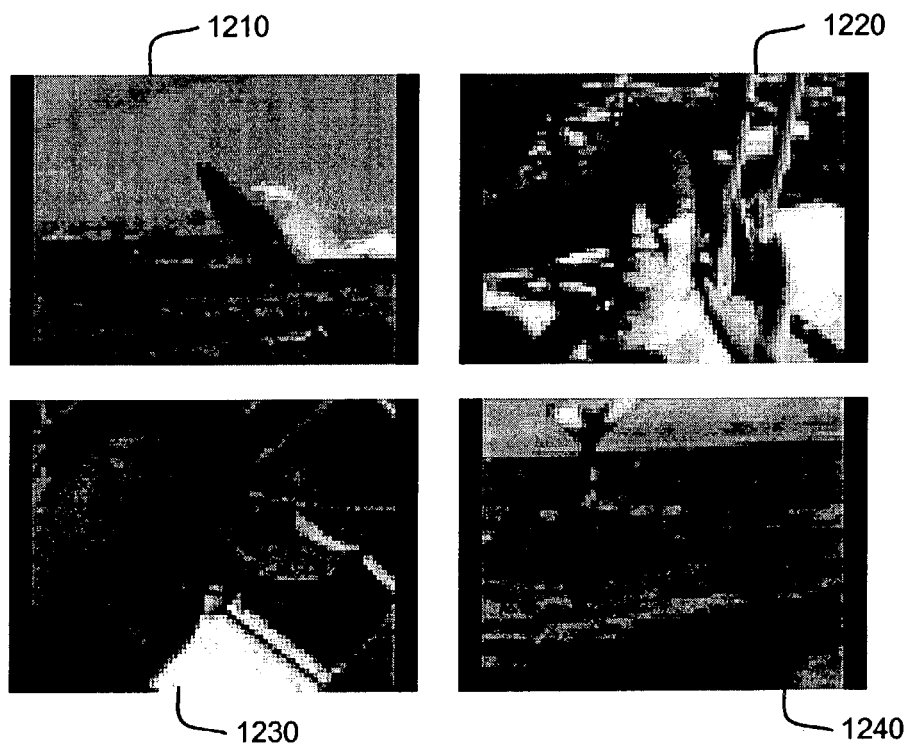
FIG. 12B illustrates the results of a search for image frames and sequences that were not likely under a generative model learned from the image sequence of FIG. 12A.

For example, in a typical video sequence continuously filmed during a long boat ride, some interesting frames of whale breaching are buried in the overall video sequence which consists mostly of frames showing an empty ocean and distant mountains. Given this image sequence, a generative model was trained on a typical scene, as illustrated by the frames 1200 of FIG. 12A. The resulting generative model was then used to find unusual segments that had a low likelihood under the model generated from the query sample. An example of the results of the search for image frames and sequences that were not likely under the learned generative model are provided in FIG. 12B. In particular, FIG. 12B illustrates four image frames, 1210, 1220, 1230, and 1240 which represent the content in the overall image that was not merely the empty ocean with the distant mountain background. Clearly, such an application is useful for quickly scanning interesting portions of an image sequence without the need to first train generative models for many different types of frames or frame sequences that may exist in the image sequence.

Figure 13:
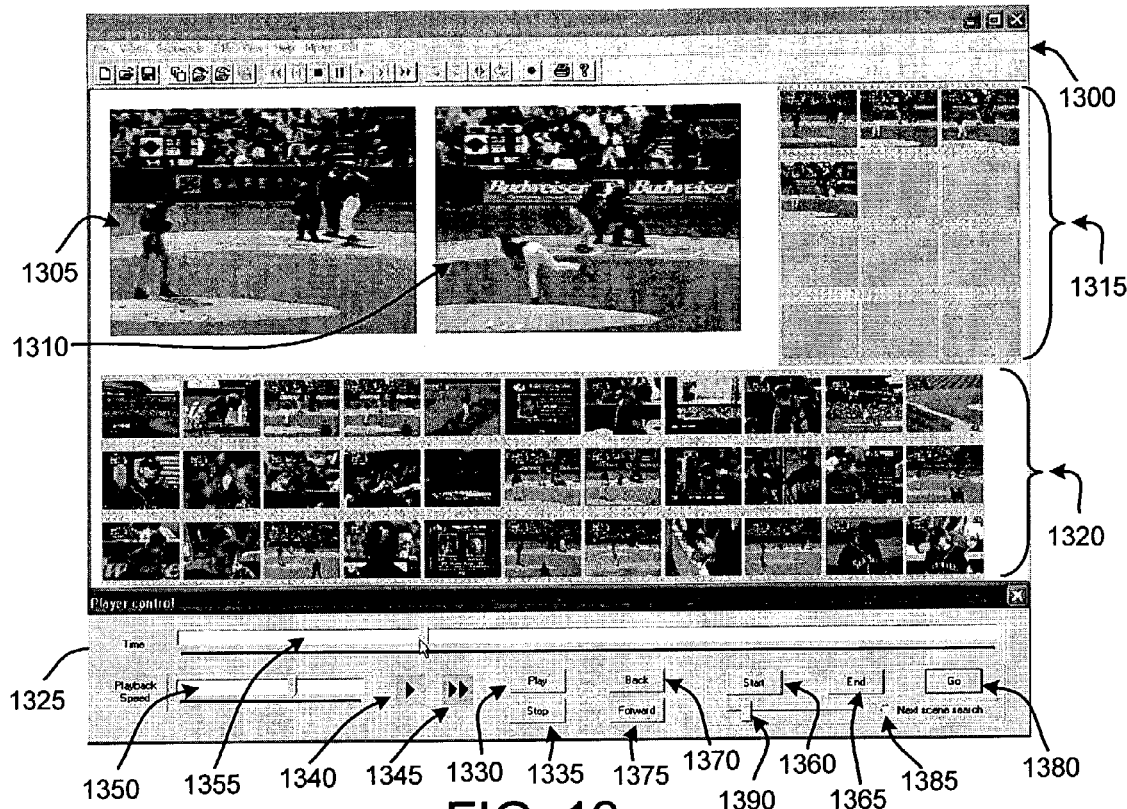
FIG. 13 illustrates an exemplary user interface for interacting with the image sequence analyzer described herein.

5.4 Exemplary User Interface:

In accordance with the preceding discussion, the aforementioned UI makes use of the capabilities described above to provide automatic fully adaptive content-based interaction and variable-speed playback of image sequences corresponding to a user identified query sample. In particular, as illustrated by FIG. 13, a working example of the UI 1300 includes an image sequence playback window 1305, a query sample window 1310, a query match window 1315, a video index window 1320, and a user control window 1325.

In general, as described in further detail below, the image sequence playback window 1305 provides playback of either the entire image sequence, or of portions of the image sequence corresponding to query sample matches. In one embodiment, the query sample window 1310 provides a representative frame from the selected query sample. Alternately, the query sample window 1310 provides a looped playback of the query sample. In addition, where a previously stored generative model is recalled rather then selecting a query sample from the input image sequence, the image frames used to learn that generative model are used to populate the query sample window 1310, again by either using a representative frame or a looped playback of those image frames. The query match window 1315 is a scrollable window that includes thumbnail representations of image frames matching the query sample. The video index window 1320 is a scrollable window that contains thumbnail representations of the input image sequence. Finally, the user control window 1325 includes controls for interacting with the input image sequence, selecting the query sample, adjusting the similarity threshold for matching the query sample, adjusting playback speed, and selecting or displaying current playback position relative to the overall input image sequence.

In particular, as noted above, the image sequence playback window 1305 provides playback of either the entire image sequence, or portions of the image sequence corresponding to query sample matches. For example, after inputting the image sequence via a conventional file open command or the like, the user plays the image sequence by using the controls provided in the user control window 1325. As noted above, the user control window 1325 includes a number of controls for interacting with the input image sequence, the query sample, and any query sample matches. For example, the user control window 1325 includes both a play 1330 and stop 1335 button for starting and stopping playback of the image sequence within the playback window 1305. Similarly, the user control window 1325 includes both a conventional graphical play button 1340 for starting playback of the image sequence within the playback window 1305, and a conventional graphical fast forward button 1345 for fast forwarding playback of the image sequence within the image sequence playback window 1305.

In addition, a playback speed slider bar 1350 is provided for indicating the playback speed of the input image sequence. Further, the playback speed slider bar 1350 is active such that user selection and adjustment of that slider bar serves to automatically speed up or slow down video playback as desired. Note that as described above, the playback speed of the input image sequence automatically speeds up or slows down as a function of the similarity of the current image frame to the query sample during playback. For example, as described above, where the user is searching for image frames similar (or dissimilar) to the query sample, as the similarity of the current image frame approaches the query sample, the playback speed will decrease towards a normal playback speed. Conversely, as the similarity of the current image frame diverges from the query sample, playback speed will increase. As a result, those portions of the input image sequence of interest to the user are played at normal or near-normal speeds, while those portions of the input image sequence not of interest to the user are played at faster speeds. Note that the operation of slider bars is well understood by those skilled in the art. Consequently a discussion of the processes underlying slider bar operation will not be provided herein.

Further, the user control window 1325 also includes a video position slider bar 1355 that displays the current playback position of the input image sequence. This video position slider bar 1355 automatically moves in real time as the image sequence, or portion thereof, is played to indicate the current image sequence playback position. Further, the video position slider bar 1355 is active such that user selection and adjustment of the slider bar serves to automatically move the playback to any position selected by user movement of the video position slider bar.

As noted above, the query sample window 1310 provides a representative frame or looped sequence from the selected query sample. Selection of the query sample is accomplished by use of particular controls within the user control window 1325. In particular, as noted above, playback of the input image sequence is accomplished via the image sequence playback window 1305. At any time during playback of that image sequence, selection of a start point of the query sample is accomplished by user selection of a "start" button 1360, followed by user selection of an "end" button 1365. Further, "back" and "forward" buttons 1370 and 1375, respectively are provided for jumping back or forward in the playback of the input image sequence to allow for more exact selection of the query sample boundaries. Further, note that the playback speed slider bar 1350 may also be used here to slow down or speed up video playback during selection of the query sample. Once the start and end points of the query sample have been selected, a representation of the query sample is displayed in the query sample window 1310 as noted above.

Next, after the query sample has been selected, the next steps are to automatically learn the generative model from the sample and then identify those frames or frame sequences that are similar to the query sample. This learning of the generative model and identification of matching frames or frame sequences begins as soon as the user indicates that processing should begin by selection of a "go" button or the like 1380. Further, in the event that the user desires to search for image frames or frame sequences that are dissimilar to the query sample, a radio button 1385 or check box for inverting search results as described above is provided within the user control window 1325. Further, a similarity threshold slider bar 1390 is provided for indicating the level of similarity, or dissimilarity, of the current frame to the query sample. Increasing the similarity level will typically cause less matches to be returned, while decreasing the similarity level will typically cause more matches to be returned.

Once the user selects the "go" button 1380, or otherwise starts the query-based search, matching results are displayed within the query match window 1315. As noted above, the query match window 1315 is a scrollable window that includes thumbnail representations of image frames matching the query sample. Further, also as discussed above, each of these thumbnails is active in the sense that user selection of the thumbnails immediately initiates playback of the matched image frame or frames within the image sequence playback window 1305. Further, in one embodiment, a context sensitive menu or the like is also associated with each thumbnail to allow the user to delete, save, or print the image frame or frames associated with that thumbnail, as desired.

Finally, as noted above, the UI 1300 includes the video index window 1320. Again, this video index window 1320 is a scrollable window that contains thumbnail representations of the input image sequence. In general, the video index window 1320 is populated by simply extracting a number of equidistant frames throughout the input image sequence, then displaying those image frames as thumbnail representations in the video index window 1320. As noted above, each of these thumbnails is active in the sense that user selection of the thumbnails immediately initiates playback of the input image sequence from the point of the image frame represented by the selected thumbnail within the image sequence playback window 1305. Further, in one embodiment, a context sensitive menu or the like is also associated with each thumbnail to allow the user to either save or print the image frame associated with that thumbnail, as desired.

In view of the preceding discussion, the actual images and thumbnails provided in FIG. 13 will now be further explained. In particular, the image sequence playback window 1305 includes a frame from a typical baseball game that is provided as the input image sequence. The query sample illustrated in the query sample window 1310 represents a typical pitching sequence selected from that baseball game. The query match window 1315 includes four identified pitching sequences that match the query sample within the aforementioned similarity threshold. The video index window 1320 includes thumbnails extracted from the entirety of the baseball game, with those thumbnails simply being extracted at regular intervals from within the baseball game. Finally, the user control window 1325 provides exemplary controls used to interact with the baseball game image sequence, and to identify image frames or sequences that are either similar, or dissimilar, to the selected query sample (e.g., the pitching sequence) as desired.

Figure 14:
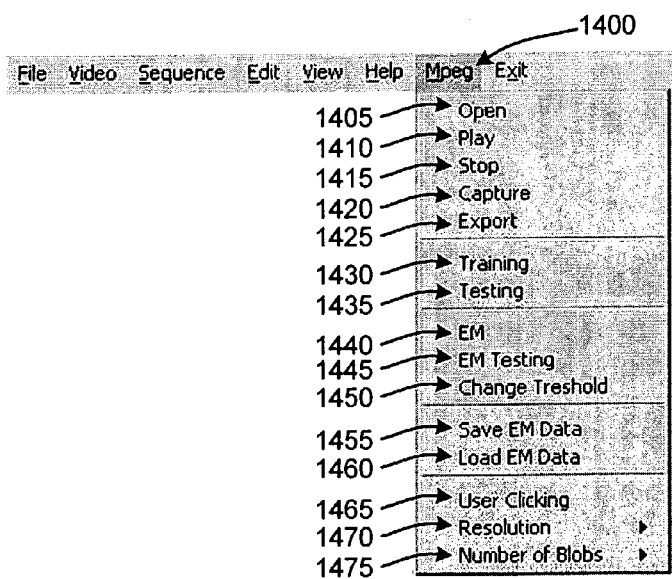
FIG. 14 illustrates an exemplary UI menu window showing menu items for interacting with the image sequence analyzer described herein.

5.4.1 Additional Menu Options for the Exemplary User Interface:

FIG. 14 provides an example of additional menu options associated with the working example of the UI 1300. In particular, in addition to conventional File Open, Save, Save As, Print, Exit, etc. menu items for opening, saving, etc. an image sequence, additional options are provided via an "Mpeg" menu 1400. Note that the name Mpeg has no special significance here, and was simply used as a matter of convenience. In particular, the additional options provided under the Mpeg menu include the following:

1) An "Open" menu item 1405 for opening an image sequence for analysis or playback.

2) A "Play" menu item 1410 for playing an image sequence.

3) A "Stop" menu item 1415 for stopping playback of the image sequence.

4) A "Capture" menu item 1420 for initiating the capture of an image sequence from one or more image sequence broadcasts, cameras, video input devices, or the like. Selection of this menu item calls up a dialog window or the like for selecting the input device or source to be used for capturing the input image sequence.

5) An "Export" menu item 1425 for exporting one or more of the matched image frames or frame sequences.

Figure 15:
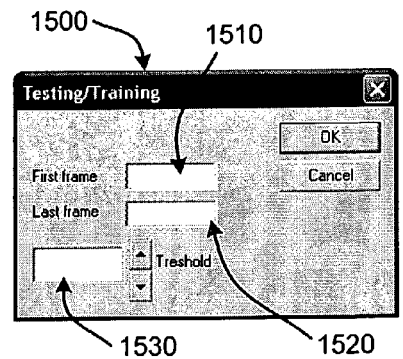
FIG. 15 illustrates an exemplary UI window for accepting user input with respect to identifying particular image frames for training a generative model and searching a video sequence.

6) A "Training" menu item 1430 for initiating training of the generative model from the query sample. In this case, a new window 1500 pops up, as illustrated by FIG. 15, in which the user can manually specify the first 1510 and the last 1520 frame of the query sample by entering a frame number of the first and the last frame. The user can also specify 1530 the aforementioned similarity threshold level, by entering a numeric value. Note that this same functionality can also be accomplished as described above with respect to FIG. 13.

7) A "Testing" menu item 1435 for initiating the aforementioned search for frames similar to the query example. Note that in one embodiment, the user is provided with the opportunity to limit the portion of the image sequence that will be searched by specifying a first and last frame for bounding the search. In this embodiment, the same input window used to specify training frames, i.e., window 1500 of FIG. 15, is provided to allow the user to specify the first and the last frame, 1510 and 1520, respectively, of a subsequence of the overall image sequence in which the similar frames will looked for.

8) An "EM" menu item 1440 for initiating training of the generative model from the query sample. In this case, first and the last frame of the query example and threshold level are specified by the sliders in the "Player control" window as described above with respect to FIG. 13, rather than using the frame number input window described above with respect to the "Training" menu option.

9) An "EM Testing" menu item 1445 for initiating the aforementioned search for frames similar to the query example.

10) A "Change Threshold" menu item 1450 to allow the user to change the similarity threshold. This menu item operates to allow the user to change the same similarity parameter as the similarity threshold slider bar 1390.

11) A "Save EM Data" menu item 1455 for saving a learned generative model for later use.

12) A "Load EM Data" menu item 1460 for loading a previously stored learned generative model.

13) A "User Clicking" menu item 1465 which provides a "check box" that has two states, checked or unchecked. The default setting is unchecked. If checked, it indicates that user needs to click on objects of interest within a video sequence in order to initialize positions and colors of the blobs in the generative model. Otherwise, the positions and colors of the blobs are initialized automatically as described above.

14) A "Resolution" menu item 1470 for changing the resolution of the generative model and input image sequence for search purposes in identifying similar or dissimilar image sequences. Note that lowering the resolution speeds up model computation and similarity searching at the cost of reduced system accuracy.

15) A "Number of Blobs" menu item 1475 for user selection of the number of blobs to be used in learning the generative model from the query sample.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-readable medium having computer executable instructions for providing automatic variable-speed playback of an image sequence, said computer executable instructions comprising:
    selecting an input image sequence via a graphical user interface;
    providing a playback of the input image sequence within a first display window within the graphical user interface;
    selecting a comparison sample via the graphical user interface;
    providing a graphical representation of the comparison sample in a second display window within the graphical user interface;
    providing a graphical representation of one or more image frames from the input image sequence that match the comparison sample in a third display window within the graphical user interface; and
    automatically varying a playback speed of the input image sequence with respect to a probabilistic likelihood of each frame of the input image sequence relative to the comparison sample.

2. The computer-readable medium of claim 1 further comprising an image sequence index window for displaying thumbnail representations of image frames extracted at regular intervals from the input image sequence.

3. The computer-readable medium of claim 2 wherein the thumbnail representations of the input image sequence are selectable via the user interface, and wherein selection of a particular thumbnail representation of the input image sequence causes the input image sequence to be played within the first display window beginning at the image frame represented by the selected thumbnail representation of the input image sequence.

4. The computer-readable medium of claim 1 wherein a determination of whether an image frame from the input image sequence matches the comparison sample comprises:
    automatically learning a generative model from the comparison sample; and
    comparing the frames in the input image sequence to the generative model to determine the probabilistic likelihood of each frame under the generative model.

5. The computer-readable medium of claim 4 further comprising a control for selecting image frames having a high probabilistic likelihood under the generative model as matching the comparison sample.

6. The computer-readable medium of claim 4 further comprising a control for selecting image frames having a low probabilistic likelihood under the generative model as matching the comparison sample.

7. The computer-readable medium of claim 4 further comprising a user adjustable similarity threshold for comparing the frames in the input image sequence to the generative model.

8. The computer-readable medium of claim 1 further comprising a playback speed slider bar for real-time adjustment of the playback speed of the input image sequence.

9. The computer-readable medium of claim 8 wherein the playback speed slider bar indicates the playback speed of the input image sequence.

10. The computer-readable medium of claim 1 further comprising a video position slider bar for indicating a current playback position of the input image sequence.

11. The computer-readable medium of claim 10 wherein the video position slider bar provides for real-time adjustment of the current playback position of the input image sequence.

12. The computer-readable medium of claim 1 further comprising a control for extracting a subset of consecutive image frames from the input image sequence to form the comparison sample.

13. The computer-readable medium of claim 1 further comprising a control for loading the comparison sample from at least one previously stored comparison sample.

14. The computer-readable medium of claim 13 wherein the previously stored comparison sample includes a previously learned generative model.

15. The computer-readable medium of claim 1 wherein selecting an input image sequence via the graphical user interface comprises automatically importing the input image sequence from at least one camera.

16. The computer-readable medium of claim 1 wherein selecting an input image sequence via the graphical user interface comprises automatically loading the input image sequence from a computer readable storage medium.

17. The computer-readable medium of claim 1 wherein providing the graphical representation of the comparison sample in the second display window comprises displaying a representative image frame from the comparison sample.

18. The computer-readable medium of claim 1 wherein providing the graphical representation of the comparison sample in the second display window comprises displaying a looped playback of the image frames comprising the comparison sample.

19. The computer-readable medium of claim 1 wherein the graphical representation of one or more image frames from the input image sequence that match the comparison sample are provided as user selectable thumbnail representations.

20. The computer-readable medium of claim 19 wherein selection of any of the user selectable thumbnail representations causes playback of the one or more image frames from the input image sequence that match the comparison sample within the first display window.

21. The computer-readable medium of claim 1 wherein automatically varying the playback speed of the input image sequence comprises increasing playback speed as the probabilistic likelihood decreases and decreasing playback speed as the probabilistic likelihood increases.

22. A system for providing automatic fully adaptive content-based variable-speed playback of a video, comprising:
   providing a graphical user interface;
   selecting a video via the graphical user interface;
   selecting a number of consecutive image frames from the video as a query sample via the graphical user interface;
   automatically learning a generative model from the query sample;
   displaying the video in a video window within the graphical user interface;
   displaying the query sample in a query sample window within the graphical user interface;
   matching portions of the video to the query sample by determining a probabilistic likelihood of each image frame of the video under the generative model;
   displaying the matched portions of the video as thumbnail representations within a query match window within the graphical user interface; and
   automatically varying a playback speed of the video in inverse proportion to the probabilistic likelihood of each frame.

23. The system of claim 22 wherein the playback speed of the video decreases as the likelihood increases, and wherein the playback speed increases as the likelihood decreases.

24. The system of claim 23 wherein the playback speed the video is determined by a combined likelihood of one or more adjacent image frames in the video.

25. The system of claim 22 wherein the generative model is based on a user definable number of color blobs for modeling multiple objects represented in the query sample.

26. The system of claim 22 wherein the generative model is capable of modeling occluding objects.

27. The system of claim 22 further comprising comparing the likelihood of each frame under the generative model to a similarity threshold.

28. The system of claim 27 wherein image frames that have a likelihood greater than the similarity threshold are identified as being similar to the query sample, and wherein image frames that do not have a likelihood greater than the similarity threshold are identified as being dissimilar to the query sample.

29. The system of claim 27 further comprising a control for allowing user adjustment of the similarity threshold via the graphical user interface.

30. The system of claim 22 further comprising an image sequence index window for displaying thumbnail representations of image frames extracted at regular intervals from the video.

31. The system of claim 30 wherein selection of any of the thumbnail representations of the video via the graphical user interface causes the input image sequence to be played within the video window beginning at the image frame represented by the selected thumbnail representation.

32. The system of claim 22 further comprising a playback speed slider bar for real-time adjustment of the playback speed of the video.

33. The system of claim 22 further comprising a video position slider bar for real-time adjustment of the current playback position of the video.

34. The system of claim 22 further comprising a control for loading the query sample from a set of at least one previously stored query samples.

35. The system of claim 22 further comprising a control for loading the generative model from a set of at least one previously computed generative models.

36. The system of claim 22 further comprising a control for saving the learned generative model to a computer-readable medium.

37. A computer-implemented process for using a graphical user interface for automatically identifying similar image frames in one or more image sequences, comprising:
   use a graphical user interface to select at least one image sequence, each image sequence having at least one image frame;
   use the graphical user interface to select a query sample consisting of at least one image frame from one of the at least one image sequences;
   use the graphical user interface to input a desired number of blobs to be modeled in learning a generative model of the query sample;
   automatically learn the generative model from the query sample;
   compare the frames in each image sequence to the generative model to determine a likelihood of each frame under the generative model; and
   provide an automatic variable speed playback of at least one of the image sequences within the graphical user interface relative to the likelihood of each frame under the generative model.

38. The computer-implemented process of claim 37 wherein the likelihood of each frame under the generative model is compared to an adjustable similarity threshold.

39. The computer-implemented process of claim 38 wherein image frames that have a likelihood greater than the similarity threshold are similar to the at least one image frame of the query sample, and wherein all other image frames are dissimilar to the at least one image frame of the query sample.

40. The computer-implemented process of claim 37 wherein the playback speed the at least one image sequence is inversely proportional to the likelihood of each image frame.

41. The computer-implemented process of claim 40 wherein the playback speed decreases as the likelihood increases, and wherein the payback speed increases as the likelihood decreases.

42. The computer-implemented process of claim 37 wherein the generative model models multiple objects in the query sample as blobs, and wherein the generative model is capable of modeling occluding objects in the query sample.

43. The computer-implemented process of claim 37 wherein automatically learning the generative model from the query sample comprises performing a variational expectation-maximization (EM) analysis of each image frame in the query sample for learning a probabilistic explanation of the query sample.

44. The computer-implemented process of claim 37 further comprising an image sequence index window for displaying thumbnail representations of image frames extracted at regular intervals from the at least one image sequence.

45. The computer-implemented process of claim 44 wherein selection of any of the thumbnail representations of the at least one image sequence via the graphical user interface causes the at least one image sequence to be played within the graphical user interface beginning at the image frame represented by the selected thumbnail representation.

46. The computer-implemented process of claim 37 further comprising a playback speed slider bar for real-time adjustment of the playback speed of the at least one image sequence.

47. The computer-implemented process of claim 37 further comprising a video position slider bar for real-time adjustment of a current playback position of the at least one image sequence.

* * * * *